US009622288B2

(12) United States Patent
Liao et al.

(10) Patent No.: US 9,622,288 B2
(45) Date of Patent: Apr. 11, 2017

(54) METHODS FOR MULTI-POINT CARRIER AGGREGATION CONFIGURATION AND DATA FORWARDING

(71) Applicant: MEDIATEK INC., Hsinchu (TW)

(72) Inventors: Pei-Kai Liao, Nantou County (TW); Yih-Shen Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/000,244

(22) Filed: Jan. 19, 2016

(65) Prior Publication Data

US 2016/0135248 A1 May 12, 2016

Related U.S. Application Data

(63) Continuation of application No. 13/848,987, filed on Mar. 22, 2013, now Pat. No. 9,258,809.
(Continued)

(51) Int. Cl.
*H04W 76/04* (2009.01)
*H04W 72/04* (2009.01)
(Continued)

(52) U.S. Cl.
CPC ......... *H04W 76/046* (2013.01); *H04L 1/1812* (2013.01); *H04L 5/001* (2013.01);
(Continued)

(58) Field of Classification Search
None
See application file for complete search history.

(56) References Cited

U.S. PATENT DOCUMENTS

2004/0002341 A1* 1/2004 Chen .................. H04L 12/5693
455/453
2006/0193351 A1 8/2006 Kim et al. .................. 370/538
(Continued)

FOREIGN PATENT DOCUMENTS

CN 101772179 A 7/2010
CN 101925155 A 12/2010
(Continued)

OTHER PUBLICATIONS

USPTO, Office Action for the U.S. Appl. No. 14/809,525 dated Jul. 22, 2016 (9 pages).
(Continued)

*Primary Examiner* — Hassan Kizou
*Assistant Examiner* — Hashim Bhatti
(74) *Attorney, Agent, or Firm* — Imperium Patent Works; Zheng Jin

(57) ABSTRACT

Methods of multi-point carrier aggregation configuration and data forwarding are disclosed. In one embodiment of the invention, a primary connection is established between a UE and a primary base station in a primary cell with a first UE-ID. A second connection is configured between the UE and a second base station in a secondary cell with a second UE-ID. Component carriers from the primary and the second connections are configured and aggregated. Mobility management functions are performed on the primary connection. In another embodiment of the current invention, a first UE data is received from a primary connection with a UE connecting to a first base station, a second UE data is received from a second base station. The first UE data and the second UE data are combined. A third UE data from a network entity is distributed to the first and the second base station.

20 Claims, 12 Drawing Sheets

Related U.S. Application Data

(60) Provisional application No. 61/615,062, filed on Mar. 23, 2012.

(51) Int. Cl.

| | | |
|---|---|---|
| *H04L 1/18* | (2006.01) | |
| *H04W 36/08* | (2009.01) | |
| *H04L 5/00* | (2006.01) | |
| *H04W 72/12* | (2009.01) | |
| *H04W 16/32* | (2009.01) | |
| *H04W 24/04* | (2009.01) | |
| *H04W 88/02* | (2009.01) | |
| *H04W 88/08* | (2009.01) | |

(52) U.S. Cl.
CPC .......... *H04L 5/0035* (2013.01); *H04L 5/0053* (2013.01); *H04L 5/0094* (2013.01); *H04W 16/32* (2013.01); *H04W 24/04* (2013.01); *H04W 36/08* (2013.01); *H04W 72/042* (2013.01); *H04W 72/0406* (2013.01); *H04W 72/0413* (2013.01); *H04W 72/0426* (2013.01); *H04W 72/1289* (2013.01); *H04W 88/02* (2013.01); *H04W 88/08* (2013.01)

(56) References Cited

U.S. PATENT DOCUMENTS

| | | | |
|---|---|---|---|
| 2008/0188219 A1 | 8/2008 | Fishcher | 455/434 |
| 2008/0192682 A1 | 8/2008 | Matsumoto et al. | 370/328 |
| 2009/0201868 A1 | 8/2009 | Chun et al. | 370/329 |
| 2010/0009682 A1 | 1/2010 | Iwamura et al. | 455/436 |
| 2010/0074220 A1* | 3/2010 | Jung | H04W 36/0055 370/331 |
| 2010/0220666 A1 | 9/2010 | Imamura et al. | 370/329 |
| 2010/0227569 A1 | 9/2010 | Bala et al. | 455/73 |
| 2010/0232373 A1 | 9/2010 | Nory et al. | 370/329 |
| 2010/0254329 A1* | 10/2010 | Pan | H04L 5/001 370/329 |
| 2010/0267394 A1 | 10/2010 | Wu | 455/450 |
| 2010/0271970 A1 | 10/2010 | Pan et al. | 370/252 |
| 2010/0303039 A1* | 12/2010 | Zhang | H04L 5/0035 370/331 |
| 2010/0329200 A1 | 12/2010 | Chen et al. | 370/329 |
| 2011/0038271 A1 | 2/2011 | Shin et al. | 370/252 |
| 2011/0098074 A1 | 4/2011 | Seo et al. | 455/509 |
| 2011/0128942 A1 | 6/2011 | Kim et al. | 370/336 |
| 2011/0183663 A1* | 7/2011 | Kenehan | H04W 76/048 455/423 |
| 2011/0194514 A1 | 8/2011 | Lee et al. | 370/329 |
| 2011/0235620 A1 | 9/2011 | Ahn et al. | 370/336 |
| 2011/0275403 A1 | 11/2011 | Chen et al. | 455/522 |
| 2011/0299483 A1* | 12/2011 | Wu | H04L 5/001 370/329 |
| 2011/0312316 A1 | 12/2011 | Baldemair et al. | 455/422.1 |
| 2012/0033627 A1 | 2/2012 | Li et al. | 370/329 |
| 2012/0082125 A1 | 4/2012 | Huang | 370/329 |
| 2012/0176884 A1 | 7/2012 | Zhang et al. | 370/203 |
| 2012/0302281 A1 | 11/2012 | Takano | 455/524 |
| 2012/0327908 A1 | 12/2012 | Gupta et al. | 370/331 |
| 2013/0083675 A1 | 4/2013 | Yamada | 370/252 |
| 2013/0107846 A1 | 5/2013 | Chen et al. | 370/329 |
| 2013/0176920 A1 | 7/2013 | Seo et al. | 370/280 |
| 2013/0183979 A1 | 7/2013 | Chen et al. | 455/436 |
| 2014/0112155 A1 | 4/2014 | Lindoff et al. | 370/242 |
| 2014/0119348 A1 | 5/2014 | Zhang et al. | 370/336 |

FOREIGN PATENT DOCUMENTS

| | | |
|---|---|---|
| CN | 101998550 A | 3/2011 |
| CN | 102076055 A | 5/2011 |
| CN | 102113242 A | 6/2011 |
| CN | WO2012021030 A2 | 2/2012 |
| JP | 2011217064 A | 10/2011 |
| JP | 2013542638 A | 11/2013 |
| WO | WO2010048178 | 4/2010 |
| WO | WO2010105145 | 9/2010 |
| WO | WO2011066806 | 6/2011 |
| WO | WO2012036514 | 3/2012 |

OTHER PUBLICATIONS

International Search Report and Written Opinion of International Search Authority for PCT/CN2013/073078 dated Jun. 13, 2013 (10 pages).
International Search Report and Written Opinion of International Search Authority for PCT/CN2013/073074 dated Jul. 11, 2013 (9 pages).
USPTO, Office Action for related U.S. Appl. No. 13/848,964 dated Dec. 18, 2014 (13 pages).
JPO Office Action for the JP patent application 2015-500764 dated Jul. 21, 2015 (9 pages).
EPO Search Report for the EP patent application 13764094.2 dated Aug. 31, 2015 (9 pages).
R2-095563, New Postcom, Some Issues on Carrier Aggregation (3 pages).
JPO Office Action for the JP patent application 2015-500765 dated Sep. 8, 2015 (17 pages).
EPO, Search Report for the EP patent application 13764115.5 dated Sep. 25, 2015 (8 pages).
EPO, Search Report for the EP patent application 15187227.2 dated Oct. 16, 2015 (7 pages).
USPTO, Notice of Allowance for the related U.S. Appl. No 15/000,264 dated Jan. 27, 2017 (11 pages).

\* cited by examiner

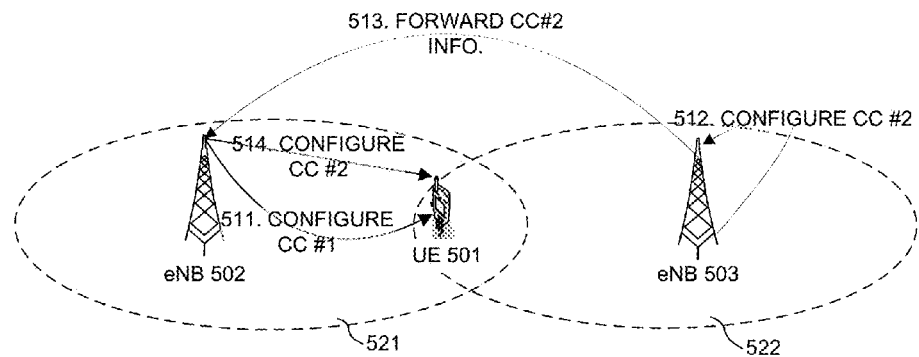
FIG. 5
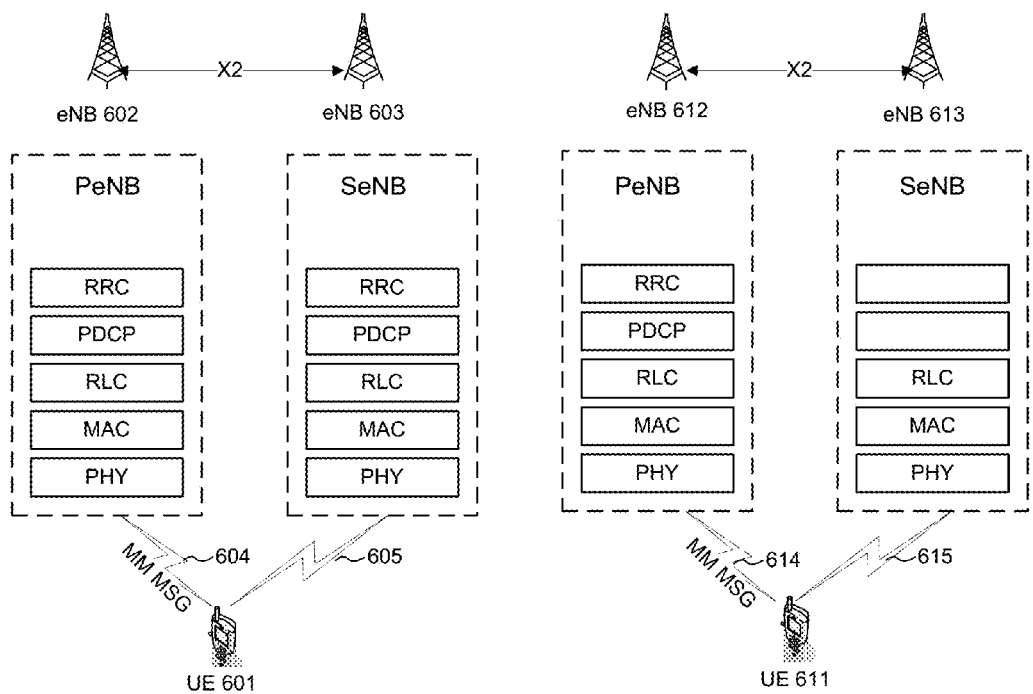
FIG. 6A                                    FIG. 6B

METHODS FOR MULTI-POINT CARRIER AGGREGATION CONFIGURATION AND DATA FORWARDING

CROSS REFERENCE TO RELATED APPLICATIONS

This application is a continuation, and claims priority under 35 U.S.C. §120 from nonprovisional U.S. patent application Ser. No. 13/848,987, entitled "METHODS FOR MULTI-POINT CARRIER AGGREGATION CONFIGURATION AND DATA FORWARDING," filed on Mar. 22, 2013, the subject matter of which is incorporated herein by reference. Application Ser. No. 13/848,987, in turn, claims priority under 35 U.S.C. §119 from U.S. Provisional Application No. 61/615,062, entitled "Multi-Point Carrier Aggregation," filed on Mar. 23, 2012, the subject matter of which is incorporated herein by reference.

TECHNICAL FIELD

The disclosed embodiments relate generally to mobile communication networks, and, more particularly, to LTE multi-point carrier aggregation configuration and data forwarding.

BACKGROUND

The exponential growth of mobile subscribers and smart phone applications require substantial increase of wireless bandwidth. The long term evolution (LTE) system is an improved universal mobile telecommunication system (UMTS) that provides higher data rate, lower latency and improved system capacity. In the LTE system, an evolved universal terrestrial radio access network includes a plurality of base stations, referred as evolved Node-Bs (eNBs), communicating with a plurality of mobile stations, referred as user equipment (UE). A UE may communication with a base station or an eNB via the downlink and uplink. The downlink (DL) refers to the communication from the base station to the UE. The uplink (UL) refers to the communication from the UE to the base station. To provide higher peak rate, LTE introduces carrier aggregation (CA) to provide higher bandwidth capable of supporting the high data rate.

In the carrier aggregation system, multiple component carriers (CCs) are aggregated and jointly used for transmission to/from a single device. The easiest way to arrange aggregation would be to use contiguous component carriers within the same frequency band, referred as intra-band contiguous carrier aggregation. Intra-band carrier aggregation can also aggregate non-contiguous CCs in the same frequency band. An inter-band carrier aggregation allows aggregating component carriers from different frequency bands. In LTE Rel-10, carrier aggregation operation defines a number of serving cells, one for each component carrier. The coverage of the serving cells may differ. The functionalities of Radio Resource Control (RRC) connection are only handled by one cell, defined as the Primary Serving Cell (PCell) served by the Primary component carrier (PCC) (DL PCC and UL PCC). One or more Secondary Serving Cells (SCell) are designed to add more bandwidth. The demand for higher bandwidth may require exploiting further on CA operation to aggregate cells from different base stations to serve a single UE, called inter-eNB carrier aggregation (inter-eNB CA).

Inter-eNB CA not only can provide enhanced throughput, it offers other benefits such as spatial diversity (or so-called multi-site diversity) gain and reduction of mobility management overhead in heterogeneous networks. Spatial diversity is an effective way to combat fading and co-channel interference in a wireless system. Inter-eNB carrier aggregation provides spatial diversity gains. For example, an UE moving within a vicinity of a small Pico cell can keep its RRC connection with the connected Marco cell by inter-eNB aggregation. The UE will be able to receive from more than one data transmission path and achieve spatial diversity. Similarly, an UE moving in a cell edge can gain spatial diversity by aggregating component carriers from two neighboring cells that the UE is able to connect to. Further, inter-eNB carrier aggregation can also potentially reduce unnecessary mobility management. For example, an UE moves within a vicinity of a small cell, such as a Pico cell, while keeping RRC connection with the current macro cell can use carrier aggregation to avoid frequent handover. The macro cell and the Pico cell can operate in different frequency band to provide higher throughput for the UE. At the same time, the UE avoids costly back and forth handover between cells.

Although inter-eNB carrier aggregation offers more flexibility for bandwidth increase together with other benefits, the current LTE system has several limitations that need to be addressed. The issues with the current LTE include UE identity handling, control-plane function handling, user-plane data transmission and physical layer signaling.

The first issue is UE identification. The current LTE carrier aggregation design has the working assumption that all cells, primary cell and secondary ones are connected to the same base station. The eNB assigns the UE a Cell Radio Network Temporary Identifier (C-RNTI) to identify specifically the UE during exchange of all information over the air. The C-RNTI is assigned during the setup of the RRC Connection and is valid only for that RRC Connection. Once the UE leaves the coverage area of the eNB, the RRC Connection must be moved a new eNB and the new eNB will assign a new C-RNTI to the UE. Therefore, it is reasonable to have only one C-RNTI for L2 scheduling and RRM management for intra-eNB CA. However, for inter-eNB CA, a second eNB will be involved in another communication session. Currently each eNB assigns C-RNTI independently. Thus, the UE Identification of C-RNTI may cause confusion among eNBs since the C-RNTI used for the UE in the first base station may have already been assigned to another UE connecting to the second base station where an inter-eNB CC resides. Therefore, a new scheme of UE Identification is required for inter-eNB carrier aggregation.

The second issue is control-plane function handling, including RRC connection maintenance and RRC connection management. RRC connection is established when UE transitions from Idle state to Connected state. "One RRC" principle applies in the current system, such that there is only one RRC connection, which is maintained by the PCell, for the communication session. For inter-eNB carrier aggregation, applying the same principle raises the questions of SCell configuration handling and mobility management functions handling.

The third issue is the user-plane data path handling. The eNBs are connected to the Packet Data network via S1 connections to the Mobility Management Entity (MME) and via S1-U connections to the Serving Gateways (SGW). For inter-eNB carrier aggregation, two separate data paths carry data for the communication sessions. Supports to aggregate and distribute signal information from/to the multiple eNBs need to be addressed.

The fourth issue is the physical layer supports for inter-eNB carrier aggregation, including downlink scheduling, uplink grants and feedback channel configuration for feedback information including Hybrid Automatic Repeat Request (HARQ) and Channel State Information (CSI). The current carrier aggregation uses two types of scheduling: cross carrier scheduling or non-cross carrier scheduling. Enabling of the cross carrier scheduling is achieved individually via the RRC signaling for each UE. When no cross carrier scheduling is arranged, the downlink scheduling assignments reside with the component carrier that carries the data. For uplink, an association is created between one downlink CC and one uplink CC. Therefore, an uplink grant from a DL CC refers to the linked uplink CC as the UL component carrier. When cross carrier scheduling is activated, a CC can schedule a different CC to carry the data. For inter-eNB carrier aggregation, coordination of CC scheduling across from different eNBs needs to be addressed. Further, HARQ and CSI are feedback information sent from UE to the base stations to ensure data streams are sent reliably over the communication channels. There are two ways to configure a feedback channel in the current carrier aggregation design. The first is to have an uplink feedback channel for each component carrier. The second is to have the primary uplink component carrier carries the feedback information for all DL CCs. To support inter-eNB carrier aggregation, the existing schemes needs to be updated to support the cross-eNB carrier aggregation, or new method of configuration can be introduced to better fit the needs for inter-eNB carrier aggregation.

SUMMARY

Methods for multi-point carrier aggregation configuration and data forwarding are disclosed. In one embodiment of the invention, an eNB establishes a primary connection with a UE in a primary cell belonging to a primary base station with a first UE-ID. The primary cell comprises a downlink component carrier (CC) and an uplink component carrier. The eNB further configures a second connection with the UE in a second cell belong to a second base station. The second cell comprises a downlink CC and an optional uplink CC. The eNB aggregates the component carriers from the first base station and the second base station. The eNB performs Mobility Management (MM) functions through the primary connection. In another embodiment of the invention, a UE establishes a primary connection with a first base station with a first UE-ID and a second connection with a second base station with a second UE-ID. The UE aggregates component carriers from the first and the second base stations based on the first and the second UE-ID. The UE performs MM functions on the primary connection.

In another embodiment of the invention, an eNB is configured as an anchor eNB, which is responsible for connecting with the network in an inter-eNB carrier aggregation system. The anchor eNB establishes a first connection with a UE and receives data signals from the first connection. The UE also establishes a second connection with a second eNB. The second eNB forwards the anchor eNB the data signals from the second connection with the UE. The anchor eNB combines the data signals. The anchor eNB also receives data signals from a network entity, such as an MME. It distributes the data signals from the network entity to the second eNB. In one embodiment of the invention, the anchor eNB performs multiplexing of the data signals. In another embodiment of the invention, the anchor eNB performs soft combining of the data signals.

Methods for physical layer multi-point carrier aggregation and multi-point feedback configuration are disclosed. In one embodiment of the invention, a UE receives an upper layer configuration for an inter-eNB carrier aggregation. The configuration includes a first UE-ID associated with a first group of downlink and uplink component carriers and a second UE-ID associated with a second group of downlink and uplink component carriers. The UE receives downlink control information via one or more downlink control channels on one or downlink component carries. The UE decodes the downlink control information using the first UE-ID and the second UE-ID. In one embodiment of the invention, the first group of downlink and uplink component carriers is connected to a first base station and the second group of downlink and uplink component carriers is connected to a second base station. In one embodiment of invention, a downlink component carrier connected to the first base station can schedule another component carrier that is connected to the second base station.

In another embodiment of the invention, a UE receives an upper layer configuration for uplink feedback information. A first uplink feedback component carrier is associated with a first group downlink component carriers and a second uplink feedback component carrier is associated with a second group of downlink component carriers. The UE aggregates a set of feedback information for the downlink component carriers associated with the first uplink feedback component carrier and the second uplink feedback component carrier. The UE generates the feedback channels to carry the aggregated feedback information for the first and the second uplink feedback component carrier. In one embodiment of the invention, the first group of downlink component carriers is associated with a first base station and the second group of downlink component carriers is associated with a second base station.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 shows an exemplary diagram of inter-eNB SCell configuration.

FIG. 6A shows an exemplary block diagram of protocol stacks for PeNB and SeNB for a configuration of RRC messages can be transferred on both the eNBs.

FIG. 6B shows an exemplary block diagram of protocol stacks for PeNB and SeNB for a configuration of RRC messages can be transferred only on the PeNB.

DETAILED DESCRIPTION

Reference will now be made in detail to some embodiments of the invention, examples of which are illustrated in the accompanying drawings.

Figure 1:
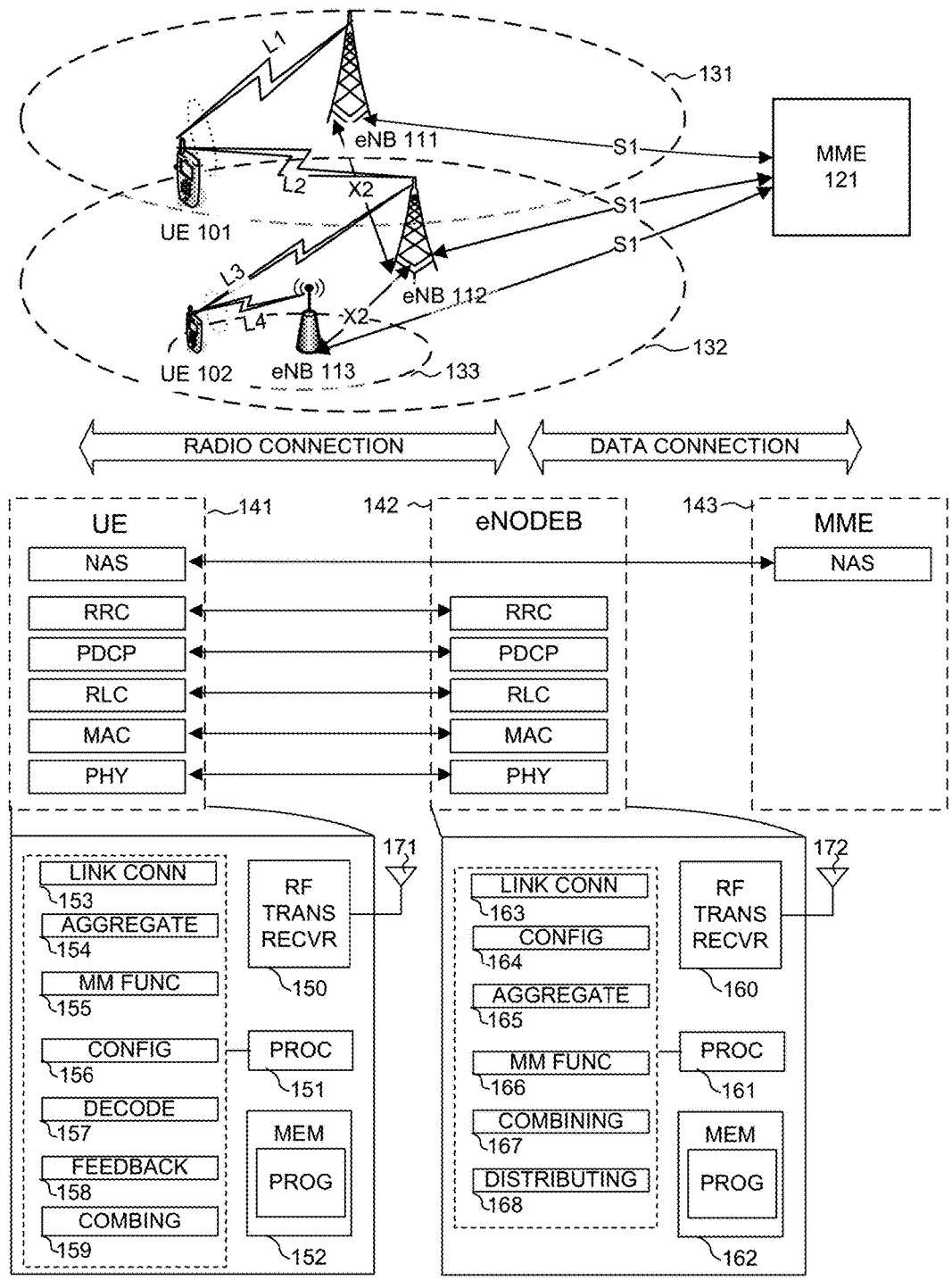
FIG. 1 schematically shows a wireless communication system and exemplary block diagrams of UE, eNB and MME in accordance with embodiments of the invention.

FIG. 1 schematically shows a wireless communication system and exemplary block diagrams of UE, eNB and MME in accordance with a novel aspect of the invention. Macro cell 131 and macro cell 132 are adjacent cells served by eNB 111 and eNB 112 respectively. eNB 111 and eNB 112 are connected with each other with a X2 link. Pico cell 133 is within macro cell 132 and is served with eNB 113. eNB 112 and eNB 113 are connected with each other with an X2 link. Each of the eNBs, eNB 111, eNB 112 and eNB 113, connects with Mobility Management Entity MME 121 via S1 links. UE 101 is at the cell edge of cell 131 and cell 132. It is likely that UE 101 can receive signals from ENB 111 via L1 and signals from ENB 112 via L2. Instead of hand over to another cell, UE 101 can use inter-eNB carrier aggregation to maintain two connections of L1 and L2 with eNB 111 and eNB 112. The initial configuration of aggregating L1 and L2 can be done by the initial serving cell and the consequent configuration of inter-eNB carrier components can be done by one cell or done by each cell. To coordinate inter-eNB configuration and/or data transmission, the X2 interface between eNB 111 and eNB 112 can be configured to transfer additional control signals or data to support inter-eNB carrier aggregation on connections L1 and L2. UE 102 connects to eNB 113 in Pico cell 133 via link L4, while maintaining connection with eNB 112 in macro cell 132 via L3. Inter-eNB aggregation can use signals from L3 and L4 to serve UE 102. To coordinate inter-eNB configuration and/or data transmission, the X2 interface between eNB 112 and eNB 113 can be configured to transfer additional control signals or data to support inter-eNB carrier aggregation on connections L3 and L4.

FIG. 1 further shows exemplary block diagrams illustrating protocol stacks of UE 141, eNodeB 142 and MME 143. UE 141 has a physical layer stack (PHY), Mac layer (MAC), Radio Link Control (RLC), Packet Data Control Protocol (PDCP), Radio Resource Control (RRC) and Non Access Stratum (NAS) layer. eNodeB 142 has corresponding protocol stacks that communicates with UE 141, include PHY, MAC, RLC, PDCP and RRC. The NAS protocol stack is transparent to eNodeB 142. The corresponding NAS protocol stack is on MME 143. FIG. 1 further shows exemplary block diagrams of UE 141 and eNodeB 142 that supports some embodiments of the present invention.

UE 141 has RF transceiver module 150, coupled with antenna 171 receives RF signals from antenna 171, converts them to baseband signals and sends them to processor 151. RF transceiver 150 also converts received baseband signals from the processor 151, converts them to RF signals, and sends out to antenna 171. Processor 151 processes the received baseband signals and invokes different functional modules to perform features in UE 141. Memory 152 stores program instructions and data to control the operations of UE 141. FIG. 1 further illustrates seven functional modules 153 to 159, which carry out embodiments of the present invention. Link connection Module 153 establishes links with multiple points or multiple eNBs to support multi-point carrier aggregation. Aggregation module 154 aggregates multiple component carriers from different eNBs. MM function module 155 performs mobility management functions. Configuration module 156 performs necessary configuration for inter-eNB carrier aggregation including configure multiple UE-IDs. Decoding module 157 decodes received data streams. Feedback module 158 generates feedback information and feedback channels. Combining module 159 performs combining multiple data streams from multiple data path in an inter-eNB carrier aggregation system.

eNodeB 142 has RF transceiver module 160, coupled with antenna 172 receives RF signals from antenna 172, converts them to baseband signals and sends them to processor 161. RF transceiver 160 also converts received baseband signals from the processor 161, converts them to RF signals, and sends out to antenna 172. Processor 161 processes the received baseband signals and invokes different functional modules to perform features in eNodeB 142. Memory 162 stores program instructions and data to control the operations of eNodeB 142. FIG. 1 further illustrates six functional modules 163 to 168 in eNodeB 142 that carry out embodiments of the current invention. Link connection module 163 manages multiple connections from different eNBs in a inter-eNB carrier aggregation system. Configuration module 164 performs configurations for multi-point carrier aggregation, including component carrier configuration and UE-ID configuration. Aggregation module 165 aggregates multiple data streams. MM Function module 166 performs mobility management functions. Combining module 167 combines multiple data streams in accordance embodiments of the invention. Distributing module 168 distribute data streams to other eNBs in an inter-eNB carrier aggregation system.

Figure 2A:
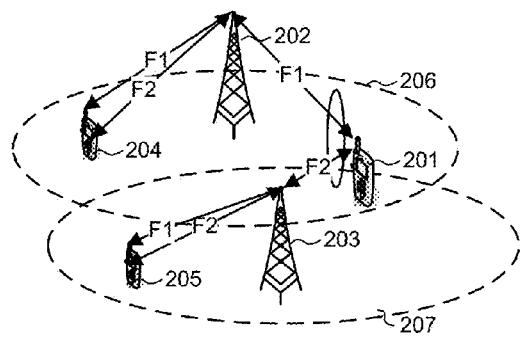
FIG. 2A shows an exemplary scenario when uplink and downlink carrier aggregation apply in macro cell to macro cell cases, where both macro cells transmit signals on F1 and F2.
Figure 2B:
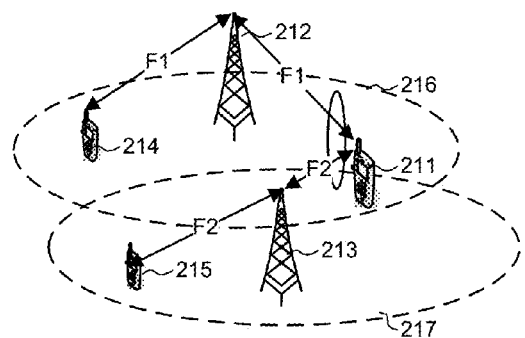
FIG. 2B shows an exemplary scenario when uplink and downlink carrier aggregation apply in macro cell to macro cell cases, where one cell transmits signals on F1 and the other transmits signals on F2.
Figure 3A:
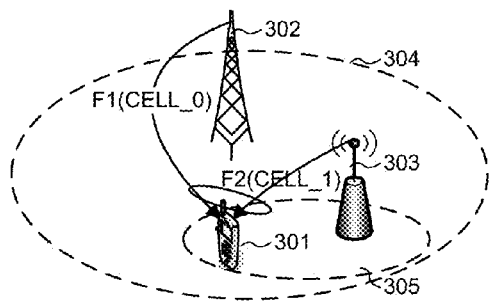
FIG. 3A shows an exemplary scenario when downlink carrier aggregation applies in macro-Pico cell cases, where the macro cell transmits signals on F1 with cell id 0, and the Pico cell transmits signals on F2 with cell id 1.
Figure 3B:
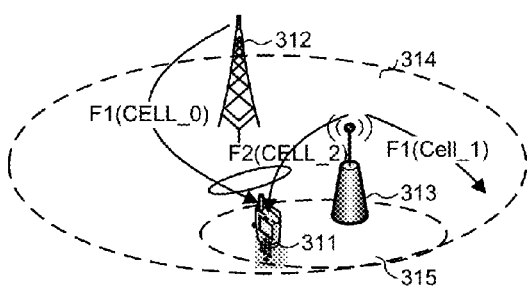
FIG. 3B shows an exemplary scenario when downlink carrier aggregation applies in macro-Pico cell cases, where the macro cell transmits signals on F1 only with cell id 0, and the Pico cell transmits signals on F1 and F2 with cell id 1 and cell id 2, respectively.
Figure 3C:
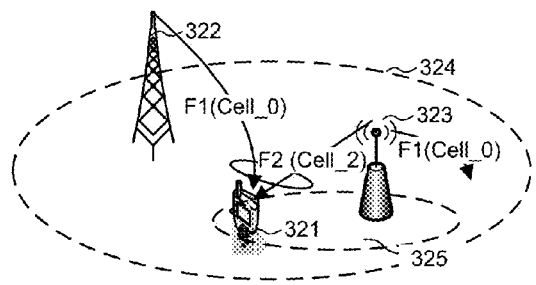
FIG. 3C shows an exemplary scenario when downlink carrier aggregation applies in macro-Pico cell cases, where the macro cell transmits signals on F1 with cell id 0, and the Pico cell transmits signals on F2 with cell id 1 and F1 with the same cell id 0.
Figure 4:
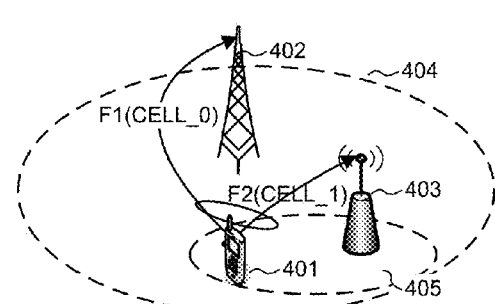
FIG. 4 shows an exemplary scenario when uplink carrier aggregation applies in macro-Pico cell cases, where the macro cell transmits signals on F1 and the Pico cell transmits signals on F2 with cell id 0 and cell id 1, respectively.

As shown in FIG. 1, inter-eNB carrier aggregation applies in many scenarios. For example, when a UE is at the edge of two neighboring macro cells, or when a UE is in a Pico cell while keeping its connection with a macro cell. The following figures show some exemplary scenarios of the above cases. FIGS. 2A and 2B show exemplary scenarios of macro cell to macro cell uplink and downlink cases. FIGS. 3A to 3C show exemplary scenarios of macro-Pico cell cases for downlink carrier aggregation and FIG. 4 shows exemplary macro-Pico case for uplink carrier aggregation.

FIG. 2A shows an exemplary scenario when uplink and downlink carrier aggregation applies in macro cell to macro cell cases, where both macro cells transmit signals on F1 and F2. Cell 206, served with eNB 202 transmits on F1 and F2. Neighboring Cell 207, served with eNB 203 also transmits on F1 and F2. UE 204 stationed in cell 206 can detect both F1 and F2. UE 205 in cell 207 can detect both F1 and F2. UE 201, which is at the cell edge of cell 206 and cell 207, may receive better signals on F1 from eNB 202 in cell 206 and F2 from eNB 203 in cell 207. Assuming UE 201 is served by F1 in cell 206, it is beneficial using inter-eNB carrier aggregation for UE 201 by aggregating CCs on F1 from cell 206 and F2 from cell 207. UE 201 can aggregate both or any one of uplink and downlink CCs on F1 from cell 206 and F2 from 207. Similar variations with a few frequency layers than shown in FIG. 2A can apply the same principles. For example, cell 206, the current serving cell for UE 201 transmits on F1 and F2, and cell 207, the neighboring cell, transmits on F2. While connecting with eNB 202 in cell 206, UE 201 at the cell edge receives better signals from F1 in cell 206 and F2 from cell 207. Aggregating uplink and/or downlink CCs on F1 in cell 206 and F2 in cell 207 would be beneficial for UE 201.

FIG. 2B shows an exemplary scenario when uplink and downlink carrier aggregation apply in macro cell to macro cell cases, where one cell transmits signals on F1 and the other transmits signals on F2. Cell 216, served with eNB 212 transmits on F1. Neighboring Cell 217, served with eNB 213 transmits on F2. UE 214 stationed in cell 216 detects F1. UE 215 in cell 217 detects F2. UE 211, which is at the cell edge of cell 216 and cell 217, may receive better signals on F1 from eNB 212 in cell 216 and F2 from eNB 213 in cell 217. Assuming UE 211 is served by F1 in cell 216, it is beneficial using inter-eNB carrier aggregation for UE 211 by aggregating CCs on F1 from cell 216 and F2 from cell 217. UE 211 can aggregate both or any one of uplink and downlink CCs on F1 from cell 216 and F2 from 217.

Similar scenarios in different macro cells configurations can benefit from inter-eNB carrier aggregation. When an UE is at the cell edges and receives better signals from two different base stations, aggregating component carriers from different base stations not only expands the bandwidth for the UE, but also avoids frequent handovers for the UE. Further, by combining data from two different paths, diversity gain can be achieved and throughput can be enhanced. Inter-eNB carrier aggregation is not only useful for UEs at macro cell edges, but also useful in other cases, like macro-Pico cell cases as shown below. FIGS. 3A to 3C show some exemplary cases for macro-Pico cell down link carrier aggregation cases. FIG. 4 shows an exemplary case for macro-Pico cell uplink carrier aggregation.

FIG. 3A shows an exemplary scenario when downlink carrier aggregation applies in macro-Pico cell cases, where the macro cell transmits signals on F1 with cell id 0, and the Pico cell transmits signals on F2 with cell id 1. UE 301 is within the range of Pico cell 305, which is inside macro cell 304. eNB 302 of macro cell 304 transmits on F1 only with cell id of 0. eNB 303 of Pico cell 305 transmits on F2 only with cell id of 1. In this configuration, UE 301 benefit from inter-eNB carrier aggregation as it receives good signals from both F1 in cell 304 and F2 in cell 305. One exemplary configuration can be use F1 as the mobility layer and F2 as the throughput/capacity enhancement layer. Mobility management functions are carried on F1 only so that frequent handover can be avoided and aggregated component carriers on F2 can enhance UE 301's throughput. Other similar configurations of the macro-Pico cell scenario apply similarly.

FIG. 3B shows an exemplary scenario when downlink carrier aggregation applies in macro-Pico cell cases, where the macro cell transmits signals on F1 only with cell id 0, and the Pico cell transmits signals on F1 and F2 with cell id 1 and cell id 2, respectively. UE 311 is within the range of Pico cell 315, which is inside macro cell 314. eNB 312 of macro cell 314 transmits on F1 only with cell id of 0. eNB 313 of Pico cell 315 transmits on F1 and F2 with cell id 1 and cell id 2, respectively. In this configuration, UE 311 benefits from inter-eNB carrier aggregation as it receives good signals from both F1 in cell 314 and F2 in cell 315. One exemplary configuration is to use F1 from macro cell 314 as the mobility layer and F2 from Pico cell 315 as the throughput/capacity enhancement layer. Mobility management functions are carried on F1 only so that frequent handovers can be avoided and aggregated component carriers on F2 can enhance UE 311's throughput. Since both macro cell 314 and Pico cell 315 transmits on F1, coordinated multipoint (CoMP) can be applied to F1 to resolve interference problem between macro cell 314 and Pico cell 315. Other similar configurations of the macro-Pico cell scenario apply similarly.

FIG. 3C shows an exemplary scenario when downlink carrier aggregation applies in macro-Pico cell cases, where the macro cell transmits signals on F1 with cell id 0, and the Pico cell transmits signals on F2 with cell id 1 and F1 with the same cell id 0. UE 321 is within the range of Pico cell 325, which is inside macro cell 324. eNB 322 of macro cell 324 transmits on F1 only with cell id of 0. eNB 323 of Pico cell 325 transmits on F1 and F2 with cell id 0 and cell id 1, respectively. In this configuration, UE 321 benefits from inter-eNB carrier aggregation as it receives good signals from both F1 in cell 324 and F2 in cell 325. One exemplary configuration is to use F1 from macro cell 324 as the mobility layer and F2 from Pico cell 325 as the throughput/capacity enhancement layer. Mobility management functions are carried on F1 only so that frequent handover can be avoided and aggregated component carriers on F2 can enhance UE 321's throughput. Since both macro cell 324 and Pico cell 325 transmit on F1, coordinated multipoint (CoMP) can be applied to F1 to resolve interference problem between macro cell 324 and Pico cell 325. Other similar configurations of the macro-Pico cell scenario apply similarly.

Inter-eNB carrier aggregation for uplink component carriers has similar scenarios. FIG. 4 shows an exemplary scenario when uplink carrier aggregation applies in macro-Pico cell cases, where the macro cell transmits signals on F1 with cell id 0, and the Pico cell transmits signals on F2 with cell id 1. eNB 402 of macro cell 404 transmits on F1 only with cell id of 0. eNB 403 of Pico cell 405 transmits on F2 only with cell id of 1. In this configuration, UE 401 benefits from inter-eNB carrier aggregation as it receives good signals from both F1 in cell 404 and F2 in cell 405. One exemplary configuration can be use F1 as the mobility layer and F2 as the throughput/capacity enhancement layer.

Control Plane Operation

Inter-eNB carrier aggregation offers many benefits. However, current LTE system does not fully support it. The first issue is control plane operations. In current LTE systems, there is only one RRC connection served by the primary cell (PCell). The PCell is the first cell that the UE establishes RRC connection with. Afterwards, one or more secondary cells (SCell) can be configured. For inter-eNB carrier aggregation, the SCell can be from the same eNB as the PCell, or can be from a different eNB. Scell configuration of inter-eNB CA scenario should be addressed.

FIG. 5 shows an exemplary diagram of inter-eNB SCell configuration. UE 501 is at cell edges of cell 521 and cell 522. eNB 502 serves cell 521 and eNB 503 serves cell 522. UE 501 receives good signals from cell 521 via eNB 502 and cell 522 via eNB 503. UE 501 establishes connection with cell 521 via eNB 502. An RRC connection is established between UE 501 and cell 521. At Step 511, Component Carrier #1 in a link connected with eNB 502 is configured by eNB 502. Since there is only one RRC connection, component carrier #2 in a link connected with eNB 503 needs X2 information change. Therefore, at Step 512, eNB 503 configures component carrier #2. At Step 513, eNB 503 forwards the CC #2's information to eNB 502 via X2 interface. eNB 502, at Step 514, sends configuration message to UE 501 to do the initial configuration for component carrier #2. After the initial steps of configuration, eNB 502, the primary eNB (PeNB), and eNB 503, the secondary eNB (SeNB), can further configure its SCells independently. To configure inter-eNB CCs, multiple-Timing Advance (TA) concept can be applied. For example, cells that belong to the same eNB can be configured as one TA group. Alternatively, network can be configured to be refrained from grouping cells from different eNBs into one TA group.

When UE is configured with inter-eNB CA, it can receive signals from PeNB and SeNB for RRC connection management messages. Since there is only RRC connection for the UE, there are two types of configuration for inter-eNB CA.

FIG. 6A shows an exemplary block diagram of protocol stacks for PeNB and SeNB for a configuration where RRC messages can be transferred on both the eNBs. UE 601 connects with eNB 602 via link 604. UE 601 also connects with eNB 603 via link 605. eNB 602 is the PeNB and eNB 603 is the SeNB. eNB 602 and eNB 603 are connected with X2 interface. There is only one RRC connection for UE 601. UE 601 receives RRC messages from both the PeNB and the SeNB on links 604 and link 605. Both the PeNB and the SeNB handle the PHY, MAC, RLC, PDCP and RRC stacks for this connection. Although eNB 602 and eNB 603 both carry RRC messages, the Mobility Management function is only performed at PeNB because a UE maintains NAS contexts only from PCell. Therefore, PeNB is the only eNB to handle all the Mobility Management related messages. Therefore, link 604 is the only link that carries MM messages, including measurement reporting and handover command. Even if eNB 603, the SeNB with RRC connection with UE 601, can directly send RRC command to UE 601, it cannot send mobility-related messages. If one of the SCells connected to the SeNB encounters bad channel condition, no RRC re-establishment is required. In general, in these cases, the spontaneous UL transmission is not allowed. Instead, light-weighted Radio Link Monitor function on SCells can be applied. That is, UE can subsequently suspend UL transmission in cases of bad connections on a SCell. No cell reselection upon SCell failure is needed as long as PCell connection retains. In general, an uplink CC on the primary link can be configured as the feedback channel for both the downlink CC in both eNBs. The feedback information is carried on the primary uplink CC only. RLM function is performed on the primary connection. Cell reselection is only performed when radio link fails on the primary connection. Alternatively, an uplink CC is configured for each eNB that carries feedback information for their corresponding downlink CCs. RLM function can be performed on both the primary and the second connection. Cell reselection function, however, is only performed on the primary connection when the primary radio link fails.

FIG. 6B shows an exemplary block diagram of protocol stacks for PeNB and SeNB for a configuration of RRC messages can be transferred only on the PeNB. UE-611 connects with eNB 612 via link 614. UE 611 also connects with eNB 613 via link 615. eNB 612 is the PeNB and eNB 613 is the SeNB. eNB 612 and eNB 613 are connected with X2 interface. There is only one RRC connection for UE 611 on link 614. UE 611 receives RRC messages from the PeNB only. The PeNB handles the PHY, MAC, RLC, PDCP and RRC stacks for this connection. The SeNB only handles PHY, MAC and RLC layers for this connection. In this configuration, additional X2 exchanges are needed. Since RRC connection is only carried on link 614 to the PeNB, the mobility management messages as well as other RRC messages are carried only on link 614.

Another issue for inter-eNB CA in the control plane is the UE identification (UE-ID) configuration. Currently, C-RNTI is the UE-ID that is assigned when UE camps on its serving cell (i.e., PCell). There is only one C-RNTI for the PCell and multiple SCells. Such configuration works when all the component carriers are connected to the same eNB. However, when component carriers are aggregated from different eNBs, multiple C-RNTIs are desired because the C-RNTI assigned in PCell may have already been used by another UE in the SCell. Therefore, assigning different UE-IDs for an UE is needed.

Figure 7:
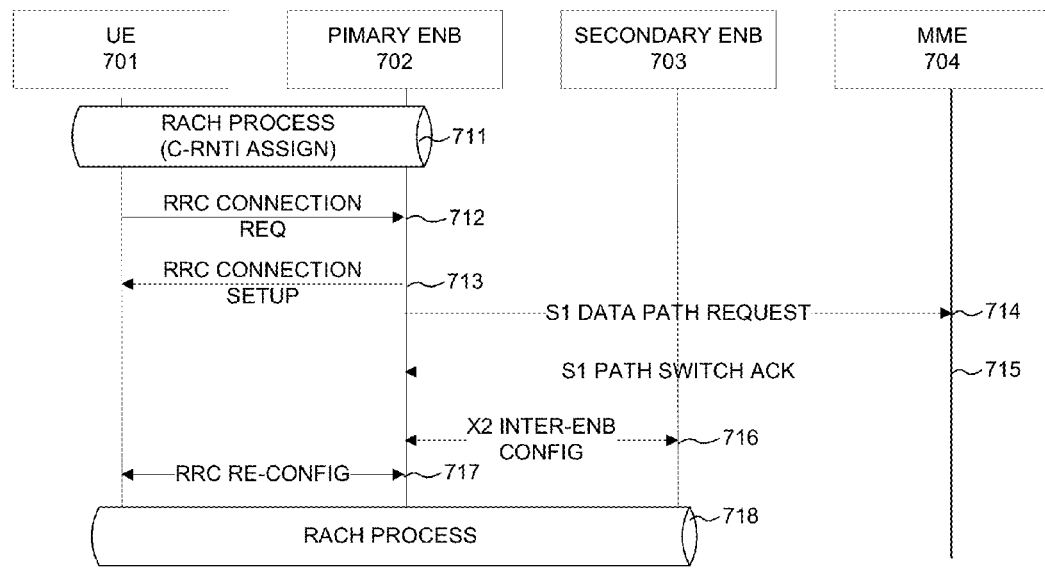
FIG. 7 shows a flow diagram in accordance with one embodiment of the invention that a second UE-ID is assigned via RRC signaling from PCell.

FIG. 7 shows a flow diagram in accordance with one embodiment of the invention that a second UE-ID is assigned via RRC signaling from PCell. UE 701 connects with primary eNB 702 and secondary eNB 703. UE 701 is configured for inter-eNB carrier aggregation. Primary eNB 702 and Secondary eNB 703 connect with MME 704 via S1 links. At Step 711, UE 701 establishes connection with primary eNB 702 via RACH process. Primary eNB 702 assigns a first C-RNTI to UE 701. At Step 712, UE sends RRC Connection Request message to primary eNB 702. At Step 713, primary eNB 702 replies with RRC Connection Setup message. The RRC connection between UE 701 and eNB 702 is established. Primary eNB 702 proceeds to set up data path with MME 704 by sending S1 Data Path Request to MME 704 at Step 714. Upon receiving the request, at Step 715, MME 704 replies with S1 Path Switch ACK message. At Step 716, primary eNB 702 communicates with secondary eNB 703 via X2 interface to perform inter-eNB configuration. The communication may include a negotiation process to coordinate a second C-RNTI number for UE 701 for its connection with secondary eNB 703. Various other negotiation and configuration can be done during this negotiation to set up CA between primary eNB 702 and secondary eNB 703. At Step 717, primary eNB 702 sends a RRC reconfiguration message to UE 701 for inter-eNB CA configurations. At Step 718, UE 701 connects with secondary eNB 703 via RACH process.

Figure 8:
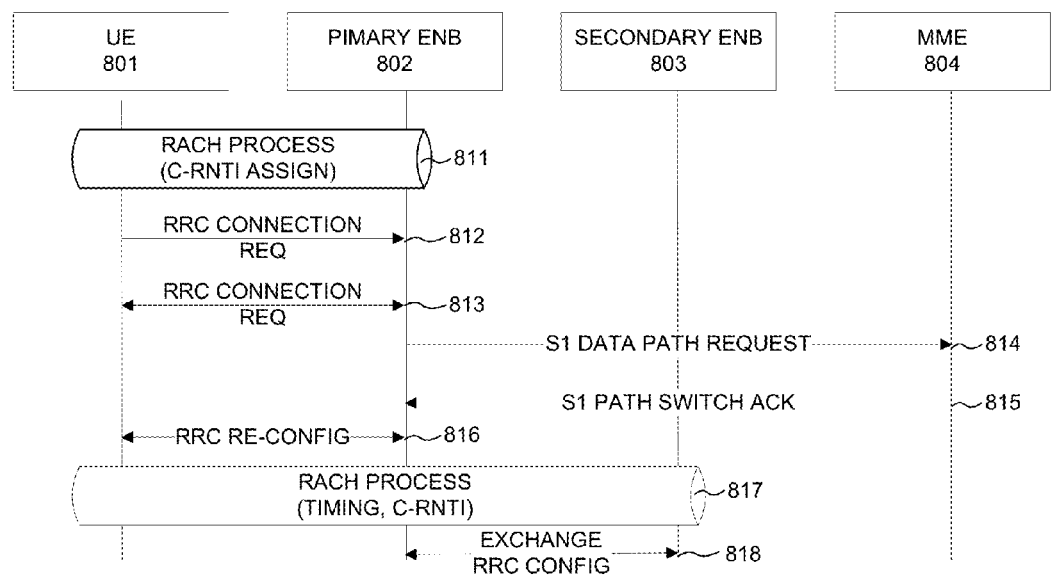
FIG. 8 shows a flow diagram in accordance with one embodiment of the invention that a second UE-ID is assigned via MAC signaling during SCell RACH procedure.

FIG. 8 shows a flow diagram in accordance with one embodiment of the invention that a second UE-ID is assigned via MAC signaling during SCell RACH procedure. UE 801 connects with primary eNB 802 and secondary eNB 803, and UE 801 is configured for inter-eNB carrier aggregation. Primary eNB 802 and Secondary eNB 803 connect with MME 804 via S1 links. At Step 811, UE 801 establishes connection with primary eNB 802 via RACH process. Primary eNB 802 assigns a first C-RNTI to UE 801. At Step 812, UE sends RRC Connection Request message to primary eNB 802. At Step 813, primary eNB 802 replies with RRC Connection Setup message. The RRC connection between UE 801 and eNB 802 is established. Primary eNB 802 proceeds to set up data path with MME 804 by sending S1 Data Path Request to MME 804 at Step 814. Upon receiving the request, at Step 815, MME 804 replies with S1 Path Switch ACK message. At Step 816, primary eNB 802 sends a RRC reconfiguration message to UE 801 for inter-eNB CA configurations. At Step 817, UE 801 connects with secondary eNB 803 via RACH process. Secondary eNB 803 configures UE 801 with a second C-RNTI together with timing information. At Step 818, primary eNB 802 and secondary eNB 803 exchanges configured RRC parameters to complete the inter-eNB UE identity configuration.

Figure 9:
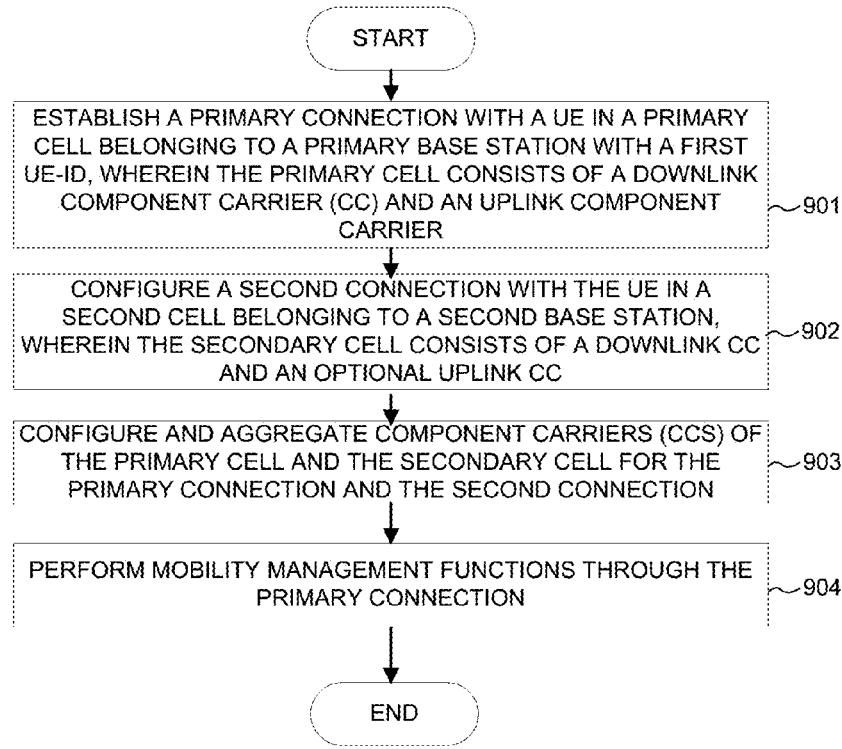
FIG. 9 is an exemplary flow diagram in accordance to embodiments of the current invention that configures control plane parameters for an inter-eNB carrier aggregation.

FIG. 9 is an exemplary flow diagram in accordance to embodiments of the current invention that configures control plane parameters for an inter-eNB carrier aggregation. An eNB, at Step 901, establishes a primary connection with a UE in a primary cell belonging to a primary base station with a first UE-ID, wherein the primary cell comprises a downlink component carrier (CC) and an uplink component carrier. The eNB, at Step 902, configures a second connection with the UE in a second cell belonging to a second base station, wherein the secondary cell comprises a downlink CC and an optional uplink CC. At Step 903, the eNB configures and aggregates component carriers (CCs) of the primary cell and the secondary cell for the primary connection and the second connection. At Step 904, mobility management functions are performed through the primary connection.

U-Plane Operation

The second issue with inter-eNB CA is U-plane configurations. In inter-eNB CA, when UE or network receives data from multiple frequency layers or sends signals to multiple frequency layers, configuration and signal combination or multiplexing issues need to be addressed. There are two main categories of issues. The first is which entity to terminate the data path. The second is how to aggregate these received data.

Figures 10A, 10B:
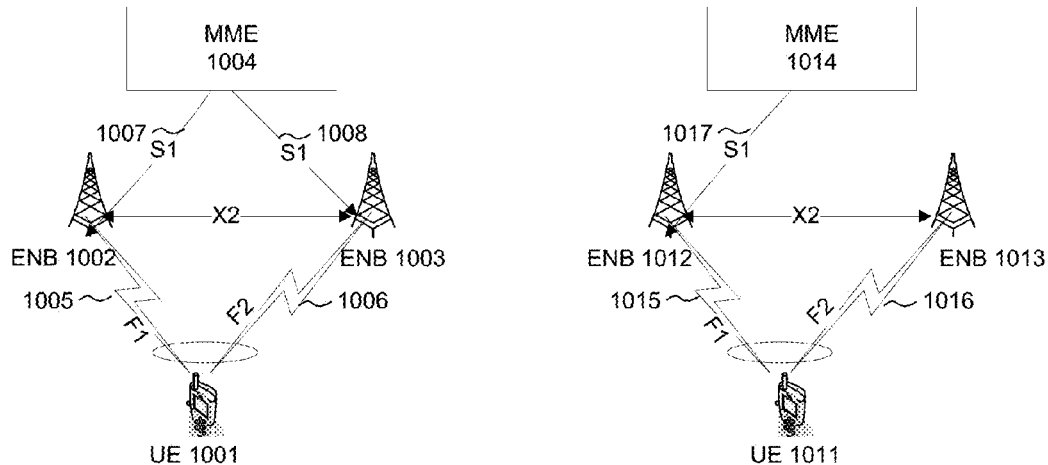
FIG. 10A shows an exemplary diagram in accordance with one embodiment of the invention where the MME is configured to be the aggregating entity.
FIG. 10B shows an exemplary diagram in accordance with one embodiment of the invention where an eNB is configured to be the aggregating entity.

FIG. 10A shows an exemplary diagram in accordance with one embodiment of the invention where the MME is configured to be the aggregating entity, also called anchor entity. Since data could be transmitted over both PCell connection and SCell connection, anchor entity is needed. UE 1001 connects with eNB 1002 and eNB 1003 via connections 1005 and 1006, respectively. Carrier aggregation is configured on connection 1005, which is on F1 and connection 1006, which on F2. eNB 1002 and eNB 1003 connect to each other via X2 interface. MME 1004 connects with eNB 1002 and eNB 1003 via S1 links. In this configuration, MME establishes two dedicated S1 links 1007 and 1008. eNB 1002 and eNB 1003 handles data packets separately without coordination. In this first configuration, a network entity, like MME 1004, is configured to be the anchor entity to handle aggregation of data packets from eNB 1002 and eNB 1003. MME 1004, as the anchor entity, needs to handle addition signaling overhead and to handle more than one data path for UE 1001. Additional impacts and overhead are added to MME 1004 and S1 links 1007 and 1008. For example, upon changing of a SCell, MME 1004 needs to re-establish new data path with the new SCell. Such operation, however, is transparent to eNBs and has less impact on eNB operation.

FIG. 10B shows an exemplary diagram in accordance with one embodiment of the invention where an eNB is configured to be the aggregating entity, also called anchor entity. UE 1011 connects with eNB 1012 and eNB 1013 via connections 1015 and 1016, respectively. Carrier aggregation is configured on connection 1015, which is on F1 and connection 1016, which on F2. eNB 1012 and eNB 1013 connect to each other via X2 interface. A network entity, like MME 1014, connects with eNB 1012 and eNB 1013 via S1 links. eNB 1012 is configured as the anchor entity. Note that, in the example, eNB1012 is the PeNB of UE1011. In this configuration, MME establishes only one dedicated S1 link 1017 that connects with eNB 1012. eNB 1013 uses X2 interface to forward the data streams to anchor eNB 1012. This operation is transparent to MME 1014. The anchor eNB, eNB 1012 needs to handle the data forwarding function via X2 interface. It has less impact on S1 interface and less impact on MME. However, additional data transfer and handling are required on the X2 interface. In view of small cell deployment scenario, eNB anchoring is a preferable solution because S1 connection setup incurs more signaling overheads.

Figure 11:
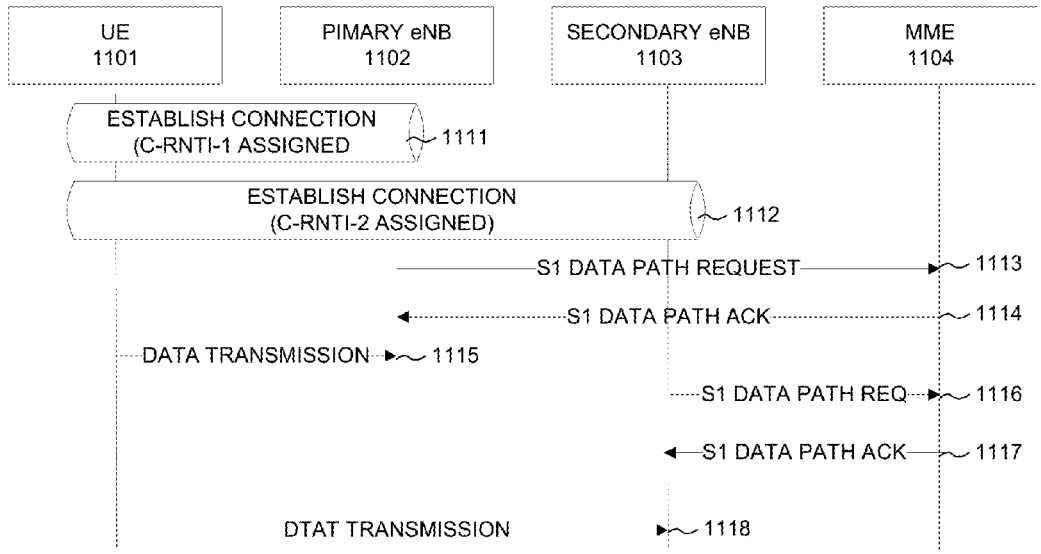
FIG. 11 shows a flow chart in accordance with one embodiment of the current invention, where two MME-eNB connections are established for inter-eNB carrier aggregation.

FIG. 11 shows a flow chart in accordance with one embodiment of the current invention, where two MME-eNB connections are established for inter-eNB carrier aggregation. UE 1101 is connected with primary eNB 1102 and secondary eNB 1103 for inter-eNB carrier aggregation. Primary eNB 1102 and secondary eNB 1103 connect to a network entity, e.g. MME 1104, via S1 links. In this configuration, two S1 data links are established because the network entity is configured to be the anchor entity. At Step 1111, UE 1101 establishes connection with primary eNB 1102 on a primary cell. At Step 1112, UE 1101 establishes connection with secondary eNB 1103 on a secondary cell. RRC connection is also established for UE 1101. At Step 1113, primary eNB 1102 sends S1 Data Path Request to MME 1104. At Step 1114, MME 1104 replies with S1 Data Path Ack. The data path between primary eNB 1102 and MME 1104 is established for UE 1101. At Step 1115, UE 1101 starts data transmission to primary eNB 1102. At Step 1116, secondary eNB 1103 sends S1 Data Path Request to MME 1104. At Step 1117, MME 1104 sends S1 Data Path ACK to secondary eNB 1103. The data path between secondary eNB 1103 and MME 1104 is established for UE 1101. At Step 1118, UE 1101 starts data transmission to secondary eNB 1103.

Figure 12:
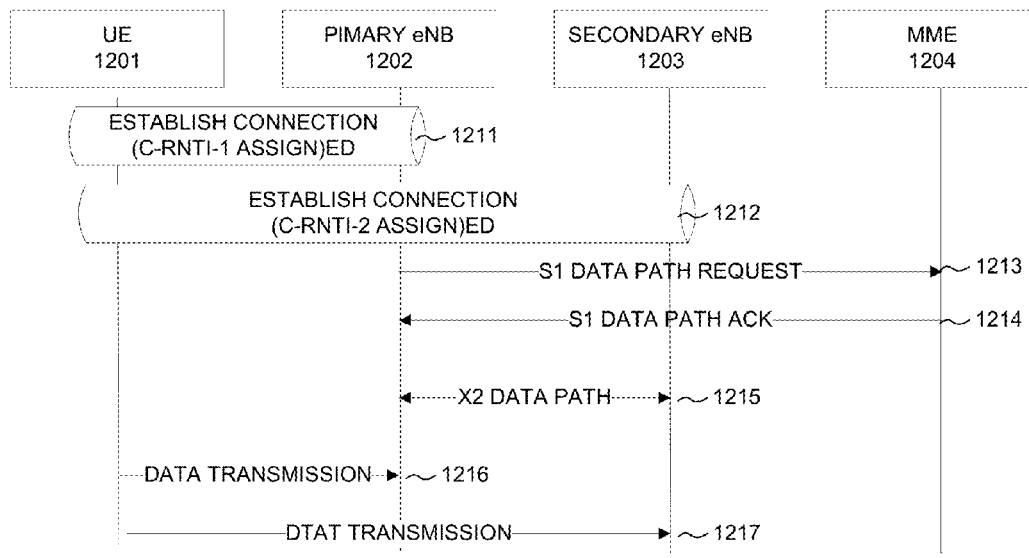
FIG. 12 shows a flow chart in accordance with one embodiment of the current invention, where only one MME-eNB connection is established via the primary eNB.

FIG. 12 shows a flow chart in accordance with one embodiment of the current invention, where only one MME-eNB connection is established via the primary eNB. UE 1201 is connected with primary eNB 1202 and secondary eNB 1203 for inter-eNB carrier aggregation. Primary eNB 1202 and secondary eNB 1203 connect to a network entity, like MME 1204, via S1 links. In this configuration, only one S1 data link is established because the primary eNB 1202 is configured to be the anchor entity. At Step 1211, UE 1201 establishes connection with primary eNB 1202 on a primary cell. At Step 1212, UE 1201 establishes connection with secondary eNB 1203 on a secondary cell. At Step 1213, primary eNB 1202 sends S1 Data Path Request to MME 1204. At Step 1214, MME 12104 replies with S1 Data Path Ack. The data path between primary eNB 1202 and MME 1204 is established for UE 1201. At Step 1215, X2 data path is established between primary eNB 1202 and secondary eNB 1203 via X2 interface. At Step 1216, data transmission starts between UE 1201 and primary eNB 1202 starts. At Step 1217, data transmission starts between UE 1201 and secondary eNB 1203 starts. In this configuration, primary eNB 1202 will combine data from itself with data from secondary eNB 1203 and forward to the network entity like MME 1204. Note that, the data combination takes place in link layer (e.g., radio link control (RLC) layer or packet data convergence protocol (PDCP) layer). Upon receiving data from MME 1204, primary eNB 1202 will distribute them to secondary eNB 1203 and itself.

In the current invention, two categories of data transmission/reception schemes can be used and configured for inter-eNB carrier aggregation. These two categories of schemes apply to both the configuration of PeNB as the anchor entity and the configuration of network entity as the anchor entity.

The first category of method is a multiplexing scheme when different data contents in bit-level are to/from different cells. For downlink transmission, after UE receives data packets from the two connections, it does not perform data combination in link control layer to reassemble original data stream. In such scheme, the original data streams (e.g., packets generated from applications) are partitioned and distributed among PeNB and SeNBs. When PeNB is configured as the anchor entity, it uses multiplexing scheme when the received uplink data from PeNB and SeNB are different. In such configuration, PDCP function is handled at PeNB. RLC of PeNB and SeNB handle data assembling function for its respective connection independently. PeNB RLC assembles different data stream from eNBs and forward to the network entity. Similarly, when receiving downlink data streams from the network entity, PeNB RLC or PDCP handles packet segmentation. PeNB forwards the segmented data streams to secondary eNBs. When MME is configured as the anchor entity, the assembly and segmentation are done at the MME.

The second category of scheme is soft combining. Such scheme applies when the data contents are the same at bit-level to/from different connections. In this scheme, soft combining at bit-level can be applied. For downlink transmission, after UE receives data bits from the two connections, it performs soft combination to decode data packets. Although the data bits are received from different frequency layer, it is possible to apply bit-level combining to enhance the received Signal to Interference Ratio (SIR). For uplink transmission, when the primary eNB is configured as the anchor entity, it combines multiple data bit streams from eNBs and performs bit-level soft combining. PeNB then forward the data to the network entity, e.g., ME. When MME is configured to be the anchor entity, it performs soft combining upon receiving multiple bit streams from different data path connecting with eNBs. In general, using such scheme can have combining gain. Diversity gain can be achieved if selective combination is applied.

A UE can be configured to use either of the above two categories of data reception/transmission schemes in a similar manner. When the UE is configured to receive different data contents at bit-level from different eNBs, it applies the multiplexing scheme as described above. When the UE is configured to receive the same data contents at bit-level from different eNBs, it applies soft combining scheme as described above. In one example, the UE first generates a bit stream by soft combining multiple bits streams from different data path, and then reassembles a data stream by decoding the soft-combined bit stream.

Figure 13:
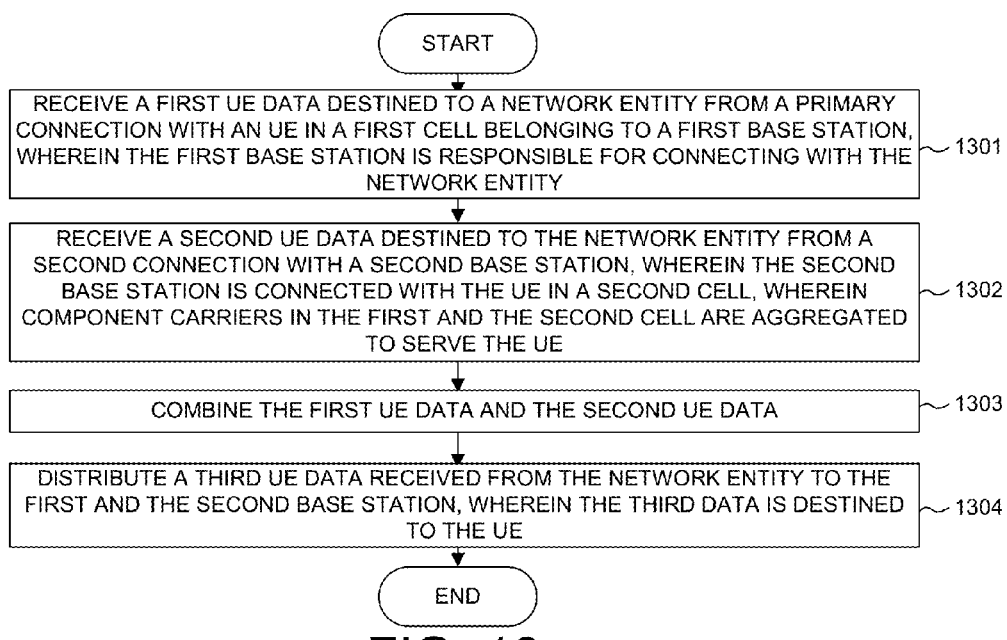
FIG. 13 shows a flow chart in accordance with some embodiments of the current invention where an eNB is configured to be the anchor entity to handle multiple data streams in an inter-eNB carrier aggregation system.

FIG. 13 shows a flow chart in accordance with some embodiments of the current invention where an eNB is configured to be the anchor entity to handle multiple data streams in an inter-eNB carrier aggregation system. An anchor eNB, at Step 1301, receives a first UE data destined to a network entity from a primary connection with an UE in a first cell belonging to a first base station, wherein the first base station is configured to be an anchor entity. The anchor eNB, at Step 1302 receives a second UE data destined to the network entity from a second connection with a second base station, wherein the second base station is connected with the UE in a second cell, wherein component carriers in the first and the second cell are aggregated to serve the UE. It then combines the first UE data and the second UE data. The anchor eNB would distribute a third UE data received from the network entity to the first and the second base station, wherein the third data is destined to the UE.

Figure 14:
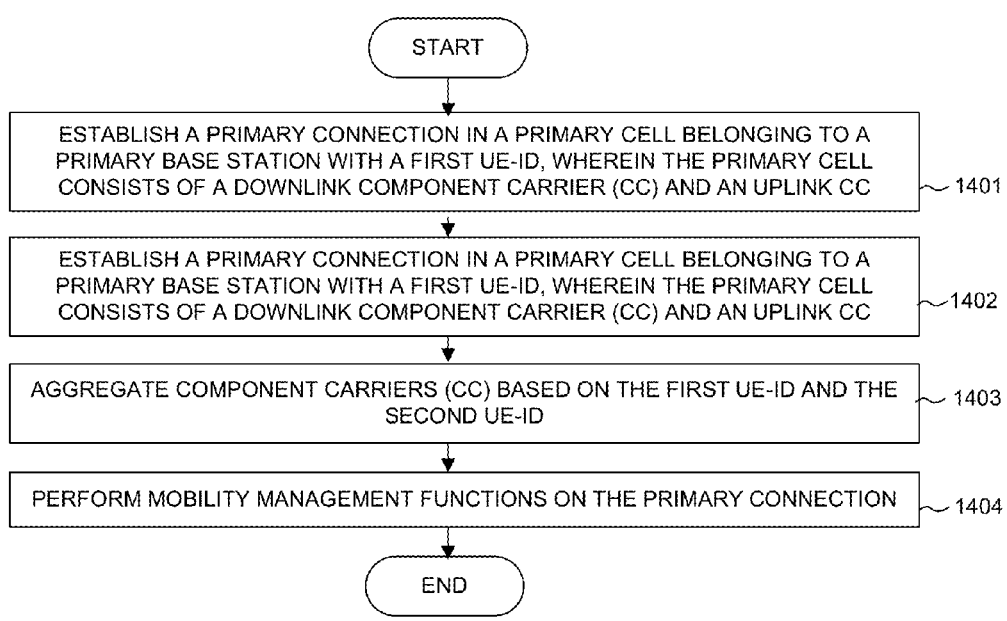
FIG. 14 shows a flow chart in accordance with some embodiments of the current invention where the UE receives multiple data streams in an inter-eNB carrier aggregation system.

FIG. 14 shows a flow chart in accordance with some embodiments of the current invention where the UE receives multiple data streams in an inter-eNB carrier aggregation system. A UE, at Step 1401, establishes a primary connection in a primary cell belonging to a primary base station with a first UE-ID, wherein the primary cell comprises a downlink component carrier (CC) and an uplink CC. At Step 1402, the UE establishes a second connection in a second cell belonging to a second base station with a second UE-ID, wherein the secondary cell comprises a downlink CC and an optional uplink CC. The UE, at Step 1403, aggregates component carriers (CC) based on the first UE-ID and the second UE-ID. At Step 1404, the UE performs Mobility Management functions on the primary connection.

Uplink and Downlink Component Carrier Scheduling

The third issue for inter-eNB carrier aggregation is downlink and uplink component carrier scheduling. In the current system, there is only one UE-ID, (e.g., C-RNTI) for carrier aggregation operation, where one UE-ID is used for all CC scheduling. In an inter-eNB carrier aggregation system, different CCs are aggregated from different base stations and different UE-IDs may apply for different CCs and different schedulers. If UE is allowed to hold multiple cell-specific UE-ID or different C-RNTI for downlink CC connecting to different base stations, the downlink scheme requires corresponding modifications. UE needs to hold multiple UE-IDs to search for downlink schedulers and downlink CCs. For multiple UE-ID configurations, there are two options. The first is to assign the same UE-ID for all CCs connecting with the same base station. In this option, which set of CCs belongs to the same base station may be transparent to an UE. The network can just configures an UE which set of CCs uses the same UE-ID or C-RNTI by higher-layer signaling and UE will just follow the higher-layer configuration for the detection of downlink control information and data reception or transmission. The second is to assign a different UE-ID for different CCs. In either scheme, improvement needs to be made to the current system at the physical layer to implement inter-eNB CA. The following sessions describe some exemplary configurations of downlink and uplink CC scheduling.

Figure 15:
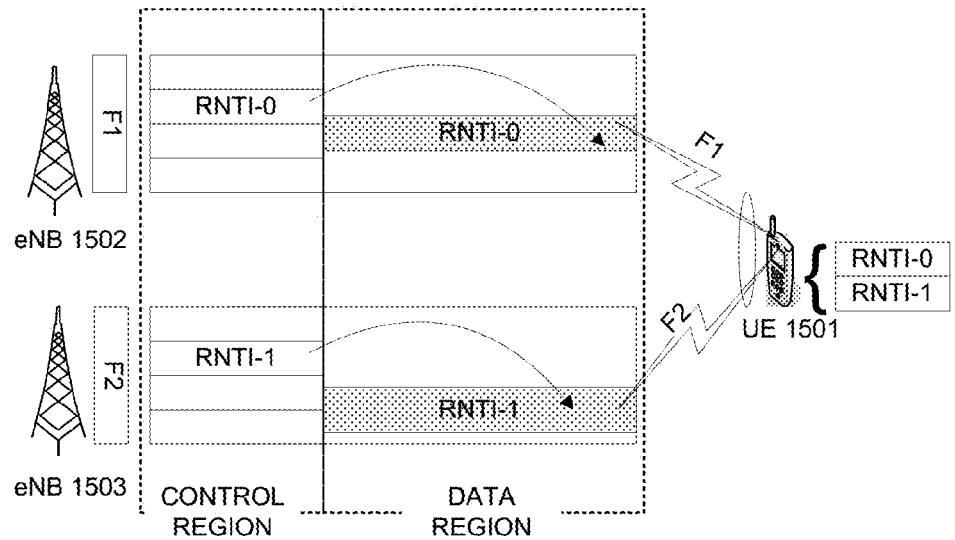
FIG. 15 shows an exemplary diagram in accordance to one embodiment of the invention, when non-cross-carrier scheduling is used for downlink CC scheduling in an inter-eNB carrier aggregation system.

FIG. 15 shows an exemplary diagram in accordance to one embodiment of the invention, when non-cross-carrier scheduling is used for downlink CC scheduling in an inter-eNB carrier aggregation system. UE 1501 is configured for inter-eNB carrier aggregation. It is configured with two UE-IDs, RNTI-0 and RNTI-1. UE needs to store these configured UE-IDs. UE 1501 connects with eNB 1502 and eNB 1503. Downlink component carriers from eNB 1502 transmit on F1. RNTI-0 is assigned to data region of DL CC on F1. Downlink component carriers from eNB 1503 transmit on F2. RNTI-1 is assigned to data region of DL CC on F2. In this exemplary configuration, each DL CC's control region schedules the data region DL CC. On F1, control region RNTI-0 scheduler points to data region in data region of the same DL CC with the same RNTI-0. On F2, control region RNTI-1 scheduler points to data region in data region of the same DL CC with the same RNTI-1. In this case, there is no cross-carrier scheduling. UE 1502 only needs to know the coupling between cell-specific UE-ID, like RNTI and the component carriers. Each base station can optionally assign different UE-ID to its DL CCs. UE 1501 receives aggregated DL CCs on F1 and F2. UE 1501 cannot assume that the UE-IDs applied for all DL CCs are the same. UE 1501 will search for the DL scheduler(s) on each DL CC with corresponding configured UE-IDs.

Figure 16:
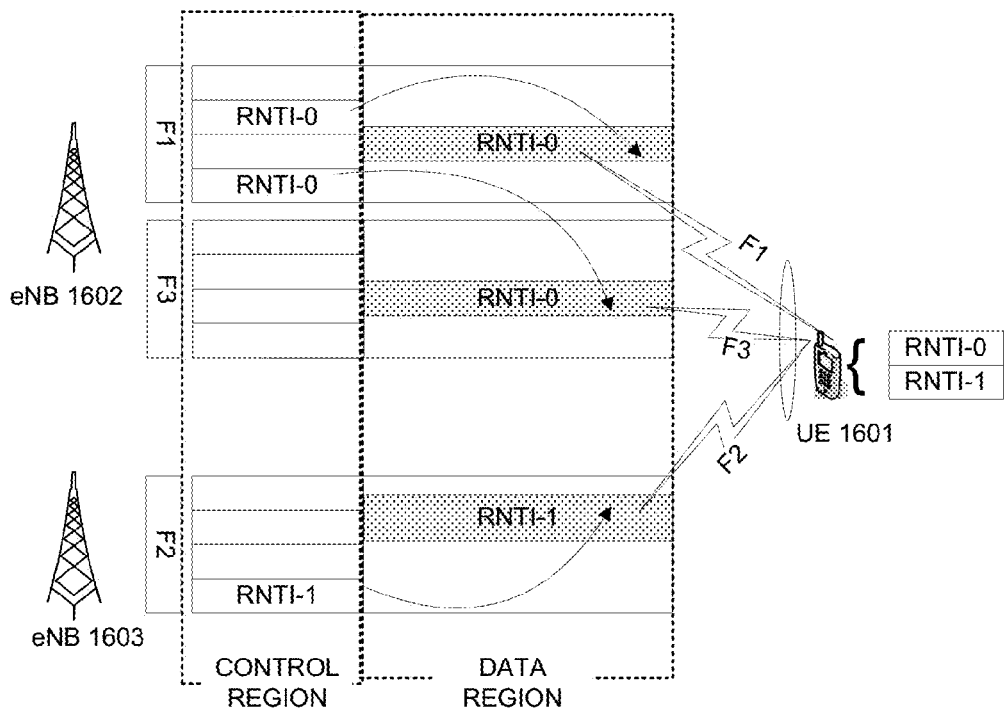
FIG. 16 shows an exemplary diagram in accordance to one embodiment of the invention, cross-carrier scheduling is only used for intra-eNB carrier components for downlink CC scheduling in an inter-eNB carrier aggregation system.

FIG. 16 shows an exemplary diagram in accordance to one embodiment of the invention, where cross-carrier scheduling is only used for intra-eNB carrier components for downlink CC scheduling in an inter-eNB carrier aggregation system. UE 1601 is configured for inter-eNB carrier aggregation. It is configured with two UE-IDs, RNTI-0 and RNTI-1. UE needs to store these configured UE-IDs. UE 1601 connects with eNB 1602 and eNB 1603. Downlink component carriers from eNB 1602 transmit on F1 and F3. RNTI-0 is assigned to the data region of DL CC on F1 and F3. Downlink component carriers from eNB 1603 transmit on F2. RNTI-1 is assigned to the data region of DL CC on F2. In this case, cross-carrier scheduling is used only for intra-eNB cases. On F1, control region RNTI-0 scheduler schedules a DL CC on F1 with RNTI-0 and another CC on F3 with RNTI-0. F1's DL CC schedules CCs on the same DL CC and on another DL CC transmitted on F3. The cross-carrier scheduling only applies for the DL CCs connect to the same eNB. On eNB 1603, control region of DL CC on F2 with RNTI-1 schedules same DL CC with the same RNTI-1. In this case, cross-carrier scheduling is limited to intra-eNB DL CCs. It is optional that the eNB can assign different UE-ID to different CCs. In this example, eNB 1602 can assign RNTI-0 to DL CC on F1, and a RNTI-2 for DL CC on F3. If intra-eNB cross-carrier scheduling applies, the control region of DL CC on F1 with RNTI-0 will schedule the DL CC on F2 with RNTI-2. UE will need to store all the configured UE-IDs. In the later optional configuration, UE 1601 will store RNTI-0, RNTI-1, and RNTI-2. UE receives aggregated CCs on F1, F2 and F3. UE 1601 cannot assume that the UE-IDs applied for all DL CCs are the same. UE 1601 searches and detects the DL scheduler(s) based on the assigned UE-IDs on each downlink CC.

Figure 17:
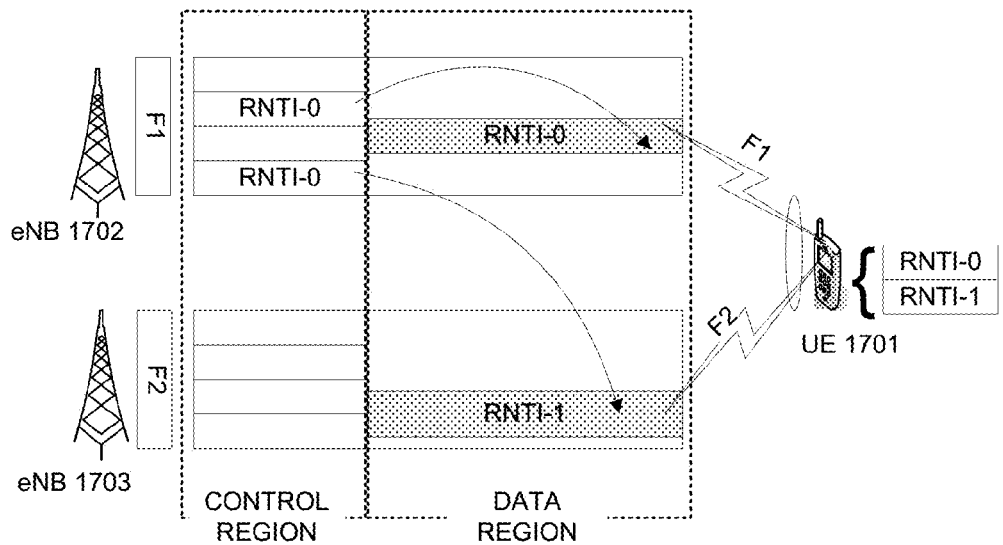
FIG. 17 shows an exemplary diagram in accordance to one embodiment of the invention, cross-carrier scheduling is used for inter-eNB carrier components for downlink CC scheduling in an inter-eNB carrier aggregation system.

FIG. 17 shows an exemplary diagram in accordance to one embodiment of the invention, where cross-carrier scheduling is used for inter-eNB carrier components for downlink CC scheduling in an inter-eNB carrier aggregation system. UE 1701 is configured for inter-eNB carrier aggregation. It is configured with two UE-IDs, RNTI-0 and RNTI-1. UE needs to store these configured UE-IDs. UE 1701 connects with eNB 1702 and eNB 1703. Downlink component carriers from eNB 1702 transmit on F1. RNTI-0 is assigned to the data region of DL CC on F1. Downlink component carriers from eNB 1703 transmit on F2. RNTI-1 is assigned to the data region of DL CC on F2. In this case, cross-carrier scheduling is used for inter-eNB cases. On F1, control region RNTI-0 scheduler schedules a DL CC on F1 with RNTI-0 and DL CC on F3 with RNTI-1, which is connected with a different eNB. F1's DL CC schedules CCs on the same DL CC and on another DL CC connected with a different eNB. The cross-carrier scheduling applies for the inter-eNB DL CCs. In this case, cross-carrier scheduling applies to inter-eNB DL CCs. It is optional that the eNB can assign different UE-ID to different CCs. UE will need to store all the configured UE-IDs. UE 1701 cannot assume that the UE-IDs applied for all DL CCs are the same. UE 1701 searches and detects the DL scheduler based on the assigned UE-IDs on each downlink CC. In such configuration, inter-eNB coordination on UE-ID assignment is not needed to avoid UE-ID confusion.

In addition to downlink scheduling, uplink grant in an inter-eNB carrier aggregation requires modifications. Uplink grants are carried in DL component carriers' control region.

There are cases that an uplink CC is linked with a downlink CC. In inter-eNB carrier aggregation system, the UE-ID for the DL CC where the uplink grant resides maybe different from the UE-ID for the uplink CC. Different configuration can be used. The following session shows some exemplary configurations for uplink grant in an inter-eNB carrier aggregation system.

Figure 18:
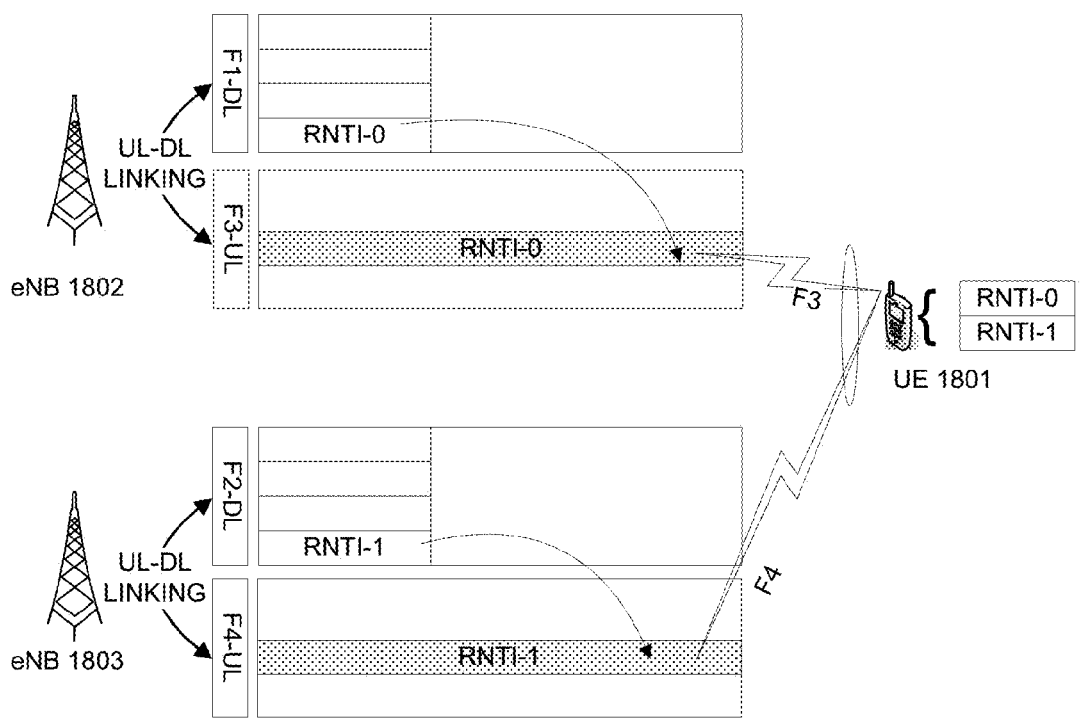
FIG. 18 shows an exemplary diagram in accordance to one embodiment of the invention, where non-cross-carrier scheduling is used for uplink CC grant in an inter-eNB carrier aggregation system.

FIG. 18 shows an exemplary diagram in accordance to one embodiment of the invention, where non-cross-carrier scheduling is used for uplink CC grant in an inter-eNB carrier aggregation system. UE 1801 is configured for inter-eNB carrier aggregation. It is configured with two UE-IDs, RNTI-0 and RNTI-1. UE 1801 needs to store these configured UE-IDs. UE 1801 connects with eNB 1802 and eNB 1803. eNB 1802 transmits downlink on F1 and uplink on F3. The DL CC on F1 is linked with the UL CC on F3 via the UL-DL linking. DL CC on F1 and UL CC on F3 are assigned UE-ID of RNTI-0. eNB 1803 transmits downlink on F2 and uplink on F4. The DL CC on F2 is linked with the UL CC on F4 via the UL-DL linking. DL CC on F2 and UL CC on F4 are assigned UE-ID of RNTI-1. In this configuration, the downlink component carrier where the uplink grant resides connects to the same base station as the linked uplink component carrier where the granted uplink data traffic resides. Each uplink CC is granted by its linked downlink CC. As shown in FIG. 18, in eNB 1802 the uplink grants for uplink CC on F3 resides in its linked DL CC on F1. The two linked component carriers are assigned with the same UE-ID, RNTI-0. Similarly, in eNB 1803 the uplink grants for uplink CC on F4 resides in its linked DL CC on F3. The two linked component carriers are assigned with the same UE-ID, RNTI-1. There is no cross-carrier scheduling in this configuration. UE 1801 stores the configured UE-IDs, RNTI-0 and RNTI-1. UE 1801 searches and detects the uplink grant based on the assigned UE-ID on each downlink component carrier. UE 1801 transmits on uplink CCs carried on F3 and F4.

Figure 19:
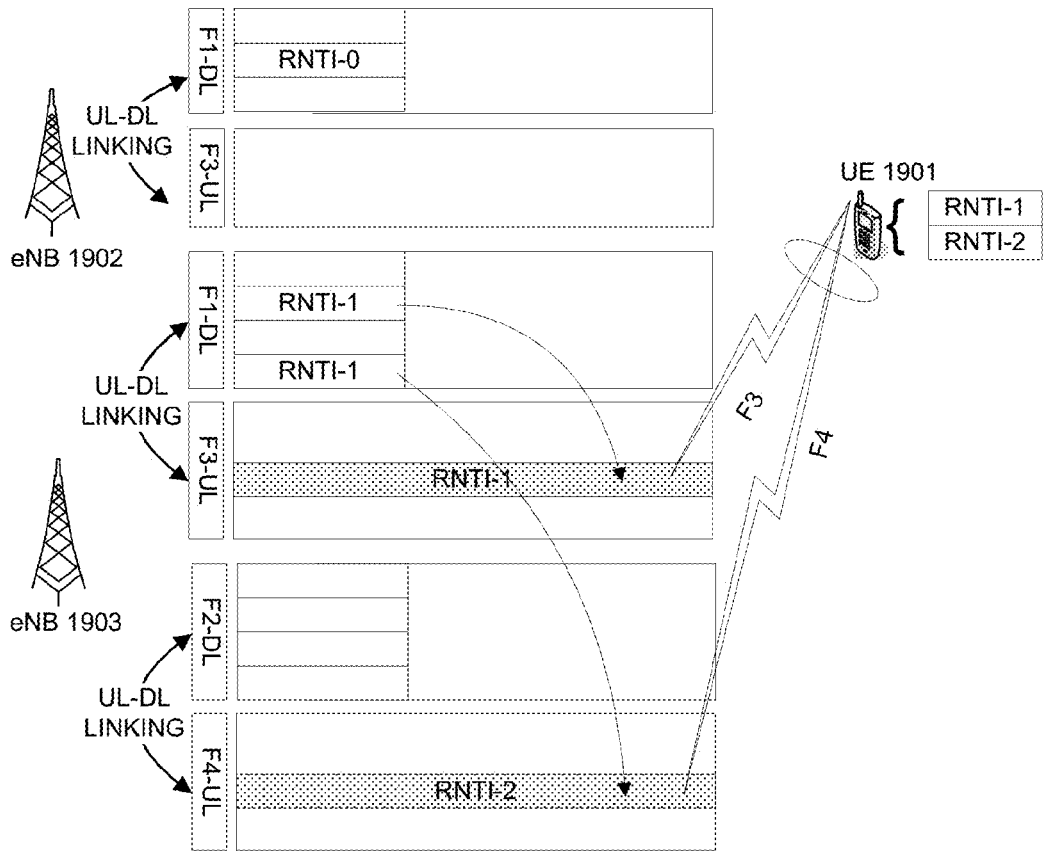
FIG. 19 shows an exemplary diagram in accordance to one embodiment of the invention, where cross-carrier scheduling is only used for intra-eNB uplink CC grant in an inter-eNB carrier aggregation system.

FIG. 19 shows an exemplary diagram in accordance to one embodiment of the invention, where cross-carrier scheduling is only used for intra-eNB uplink CC grant in an inter-eNB carrier aggregation system. UE 1901 is configured for inter-eNB carrier aggregation. It is configured with two UE-IDs, RNTI-1 and RNTI-2. UE 1901 needs to store these configured UE-IDs. UE 1901 connects with eNB 1902 and eNB 1903. eNB 1902 transmits downlink on F1 and uplink on F3. The DL CC on F1 is linked with the UL CC on F3 via the UL-DL linking. DL CC on F1 and UL CC on F3 are assigned UE-ID of RNTI-0. eNB 1903 transmits downlink on F1 and uplink on F3. The DL CC on F1 is linked with the UL CC on F3 via the UL-DL linking. DL CC on F1 and UL CC on F3 are assigned UE-ID of RNTI-1. eNB 1903 also transmits downlink on F2 and uplink on F4. The DL CC on F2 is linked with the UL CC on F4 via the UL-DL linking. DL CC on F2 and UL CC on F4 are assigned UE-ID of RNTI-2. In this configuration, the downlink component carrier where the uplink grant resides connects to the same base station as the uplink component carrier where the granted uplink data traffic resides. The downlink CC where the uplink grant resides may not be linked with the uplink CC that carries the uplink data. As shown in FIG. 19, in eNB 1903, downlink CC on F1 with RNTI-1 has uplink grant for its linked UL CC on F3 with RNTI-1. This downlink CC also carries uplink grant for uplink CC on F4 with RNTI-2, which is not linked with this downlink CC. In this configuration, cross-carrier scheduling is limited within the same eNB. UE 1901 stores the configured UE-IDs, RNTI-1 and RNTI-2 for uplink grants. UE 1901 searches and detects the uplink grant based on the assigned UE-ID on each downlink component carrier. UE 1901 transmits on uplink CCs carried on F3 and F4. In this example, the same eNB, eNB 1903, assigns two different UE-IDs to its component carries. Further, although UE 1901 is configured for inter-eNB CA and is connected with both eNB 1902 and eNB 1903, it is only transmitting to eNB 1903. UE 1901 may aggregate CCs from both the eNB 1902 and eNB 1903 for downlink CC, while only transmitting on cells in one eNB. Such configuration is useful in cases like macro-Pico cell configurations. UE 1901 may store RNTI-0 as well for downlink CC although only RNTI-1 and RNTI-2 are used for uplink carrier aggregation.

Figure 20:
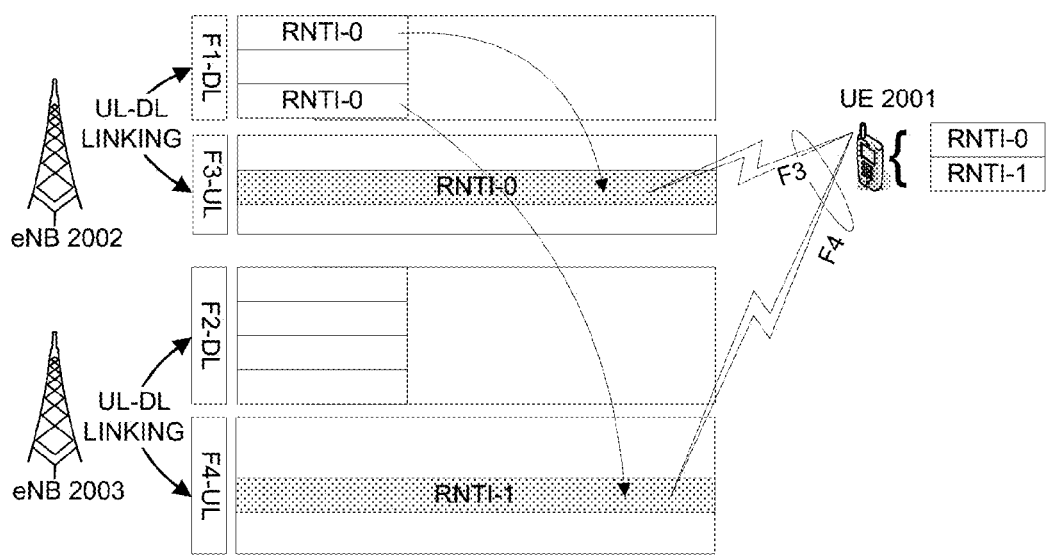
FIG. 20 shows an exemplary diagram in accordance to one embodiment of the invention, where cross-carrier scheduling is used for inter-eNB uplink CC grant in an inter-eNB carrier aggregation system.

FIG. 20 shows an exemplary diagram in accordance to one embodiment of the invention, where cross-carrier scheduling is used for inter-eNB uplink CC grant in an inter-eNB carrier aggregation system. UE 2001 is configured for inter-eNB carrier aggregation. It is configured with two UE-IDs, RNTI-0 and RNTI-1. UE 2001 needs to store these configured UE-IDs. UE 2001 connects with eNB 2002 and eNB 2003. eNB 2002 transmits downlink on F1 and uplink on F3. The DL CC on F1 is linked with the UL CC on F3 via the UL-DL linking. DL CC on F1 and UL CC on F3 are assigned UE-ID of RNTI-0. eNB 2003 transmits downlink on F2 and uplink on F4. The DL CC on F2 is linked with the UL CC on F4 via the UL-DL linking. DL CC on F2 and UL CC on F4 are assigned UE-ID of RNTI-1. In this configuration, the downlink component carrier where the uplink grant resides may connect to different base station from the uplink component carrier where the granted uplink data traffic resides. The downlink CC where the uplink grant resides may not be linked with the uplink CC that carries the uplink data. As shown in FIG. 20, in eNB 2002, downlink CC on F1 with RNTI-0 has uplink grant for its linked UL CC on F3 with RNTI-0. This downlink CC also carries uplink grant for uplink CC on F4 with RNTI-1, which connected with another eNB, eNB 2003. In this configuration, cross-carrier scheduling applies to different eNB. UE 2001 stores the configured UE-IDs, RNTI-0 and RNTI-1 for uplink grants. UE 2001 searches and detects the uplink grant based on the assigned UE-ID on each downlink component carrier. UE 2001 transmits on uplink CCs carried on F3 and F4.

Figure 21:
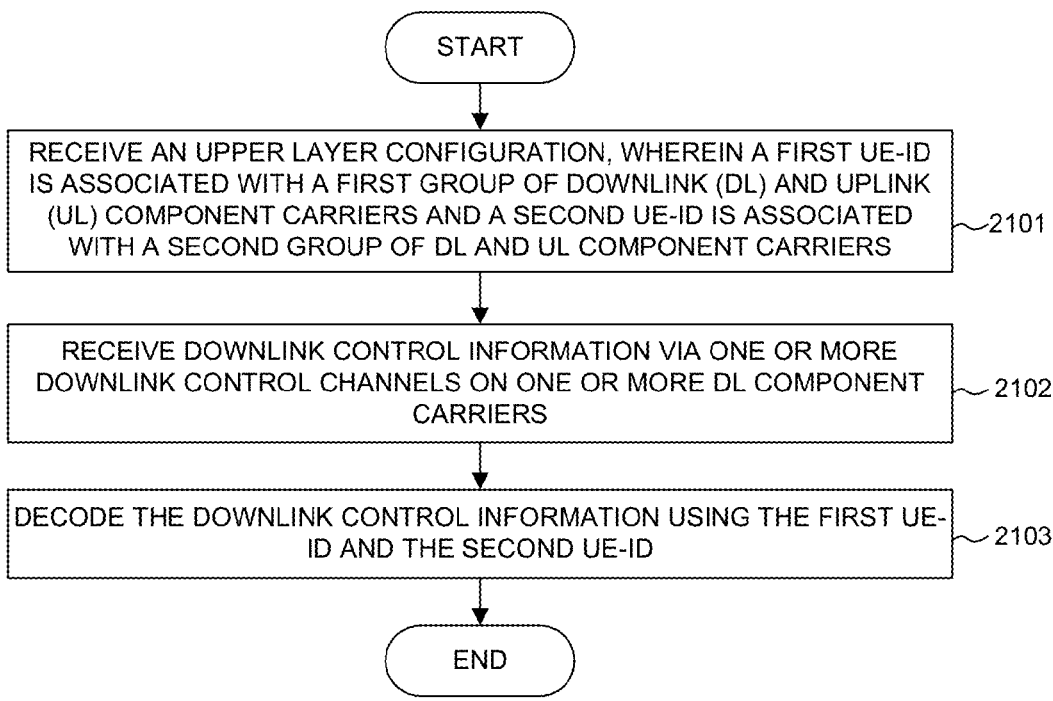
FIG. 21 is a flow chart in accordance with one embodiment of the current invention where uplink and downlink component carriers are scheduled in an inter-eNB carrier aggregation system.

FIG. 21 is a flow chart in accordance with one embodiment of the current invention, where uplink and downlink component carriers are scheduled in an inter-eNB carrier aggregation system. A UE, at Step 2101 receives an upper layer configuration, wherein a first UE-ID is associated with a first group of downlink (DL) and uplink (UL) component carriers and a second UE-ID is associated with a second group of DL and UL component carriers. The UE, at Step 2102, receives downlink control information via one or more downlink control channels on one or more DL component carriers. The UE at Step 2103 decodes the downlink control information using the first UE-ID and the second UE-ID.

Uplink Feedback Information

The fourth issue is the configuration of uplink feedback CC for feedback information such as HARQ and CSI. If inter-eNB carrier aggregation is supported, the UE may need to hold multiple UE-IDs for downlink and uplink component carriers. The HARQ and CSI feedback scheme requires corresponding changes. In general, feedback channels can be transmitted in a few different ways to implement inter-eNB carrier aggregation. The first one is to have one uplink component carrier for all feedback channels. Normally the uplink CC that carries all feedback channels is the primary uplink CC. When inter-eNB CA is enabled, such scheme requires inter-eNB data forwarding through X2 interface. The latency of X2 interface may be an issue. The second option is to have one uplink component carrier per base station for feedback channels. In this approach, feedback channels from a base station will be carried on one or more uplink component carriers associated with the same base station. Using this approach, there is no addition data forwarding on X2 interfaces. However, from UE perspective, there is no need for an UE to know the exact association between UL component carriers and base stations. UE only needs to know which uplink component carriers are configured for uplink feedback channels via higher-layer signaling. The third option is to have one uplink component carrier for one or more of its associated downlink component carriers. The association can be signaled to an UE by higher-layer signaling. This approach does not require inter-eNB data forwarding and there is no complexity of feedback aggregation. However, with many uplink component carriers for uplink feedback, the uplink transmission power efficiency may degrade severely due to the introduced high peak-to-average power ratio (PAPR) in OFDM/OFDMA systems if single RF module is used for the signal transmission on multiple uplink component carriers simultaneously. The following session shows some exemplary configurations of the above different options.

Figure 22:
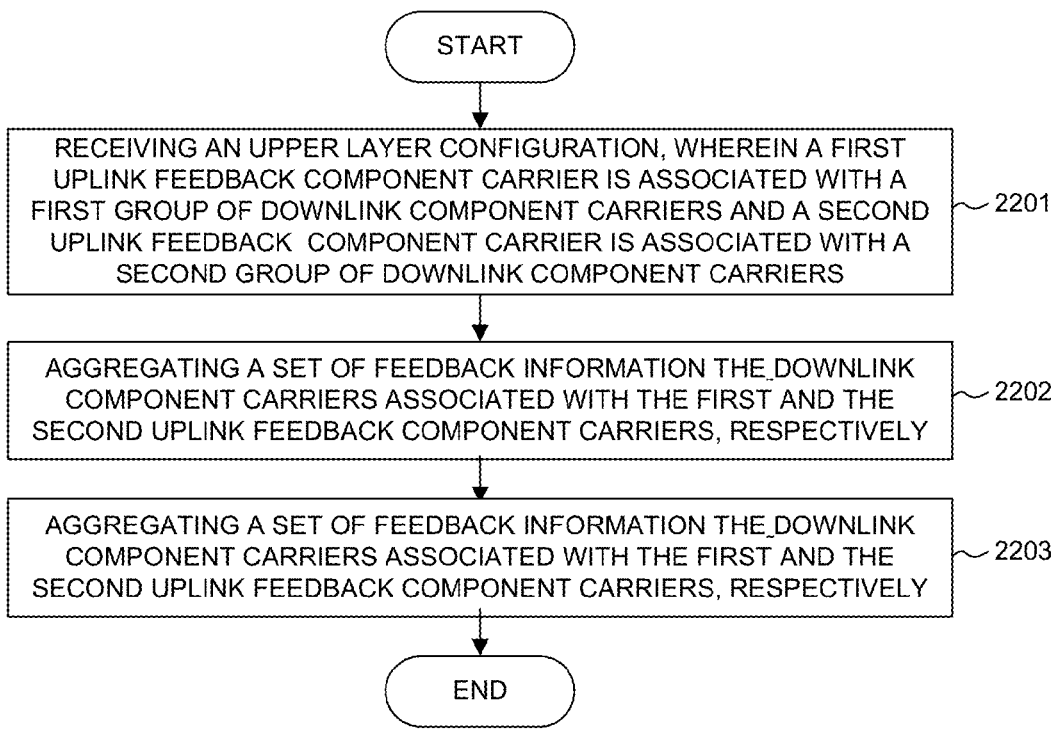
FIG. 22 is a flow chart in accordance with one embodiment of the invention wherein uplink component carriers are configured to carry uplink feedback information in an inter-eNB carrier aggregation system.

FIG. 22 is a flow chart in accordance with one embodiment of the invention wherein uplink component carriers are configured to carry uplink feedback information in an inter-eNB carrier aggregation system. A UE, at Step 2201 receives an upper layer configuration, wherein a first uplink feedback component carrier is associated with a first group of downlink component carriers and a second uplink feedback component carrier is associated with a second group of downlink component carriers. The UE, at Step 2202, aggregates a set of feedback information of downlink component carriers associated with the first and the second uplink feedback component carriers, respectively. At Step 2203, UE generates uplink feedback channels to carry the aggregated feedback information for the first and the second uplink feedback component carriers.

Figure 23A:
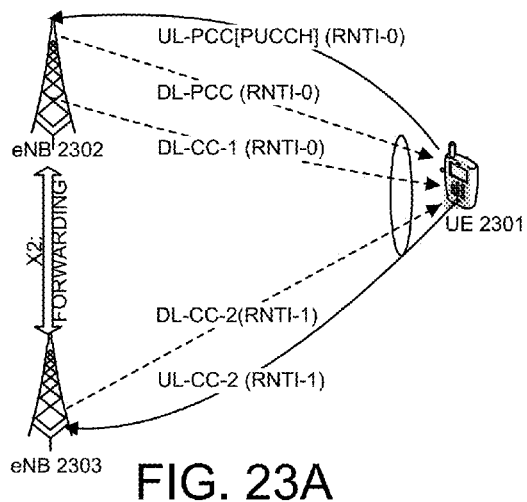
FIG. 23A shows an exemplary block diagram in accordance with one embodiment of the invention where there is one uplink component carrier for all the downlink component carriers in an inter-eNB carrier aggregation system.

FIG. 23A shows an exemplary block diagram in accordance with one embodiment of the invention where there is one uplink component carrier for all the downlink component carriers in an inter-eNB carrier aggregation system. UE 2301 connects with eNB 2302 and eNB 2303. eNB 2302 and eNB 2303 connect with each other via X2 interface. UE 2301 is configured with inter-eNB carrier aggregation with two UE-IDs RNTI-0 and RNTI-1 associated with eNB 2302 and eNB 2303, respectively. There are two downlink component carriers configured on eNB 2302, DL-PCC with RNTI-0, and DL-CC-1 with RNTI-0. The DL-PCC is the primary downlink component carrier, which is connected with an uplink primary component carrier UL-PCC with RNTI-0. One downlink component carrier is configured for eNB 2303: DL-CC-2, with RNTI-1. An uplink component carrier UL-CC-2 is configured on eNB 2303 with RNTI-1. In the first option, only the UL-PCC carries Physical Uplink Control Channel (PUCCH) carries feedback channels with feedback information for all the downlink CC, including DL-PCC, DL-CC1 and DL-CC-2. Since there is only one uplink CC carries the feedback information, X2 interface data forwarding is required.

Figure 23B:
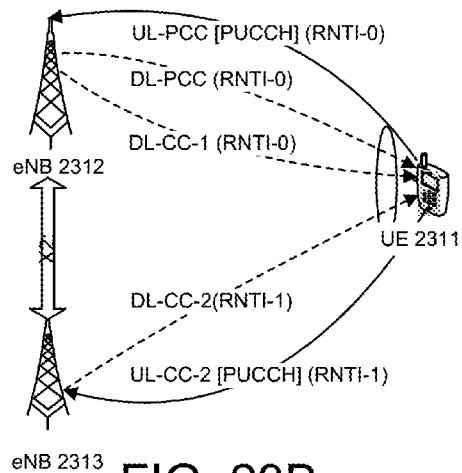
FIG. 23B shows an exemplary block diagram in accordance with one embodiment of the invention where there is one uplink component carrier for all the downlink component carriers in the same eNB in an inter-eNB carrier aggregation system.

FIG. 23B shows an exemplary block diagram in accordance with one embodiment of the invention where there is one uplink component carrier for all the downlink component carriers in the same eNB in an inter-eNB carrier aggregation system. UE 2311 connects with eNB 2312 and eNB 2313. eNB 2312 and eNB 2313 connect with each other via X2 interface. UE 2311 is configured with inter-eNB carrier aggregation with two UE-IDs RNTI-0 and RNTI-1 associated with eNB 2312 and eNB 2313, respectively. There are two downlink component carriers configured on eNB 2312, DL-PCC with RNTI-0, and DL-CC-1 with RNTI-0. The DL-PCC is the primary downlink component carrier, which is connected with an uplink primary component carrier UL-PCC with RNTI-0. One downlink component carrier is configured for eNB 2313: DL-CC-2, with RNTI-1. An uplink component carrier UL-CC-2 is configured on eNB 2313 with RNTI-1. In this option, one uplink CC is configured to carry feedback information for all DL CCs connected with the same eNB. UL-PCC in eNB2312 carries feedback information for DL-PCC and DL-CC-1 in eNB 2312 for feedback information. UL-CC-2 in eNB 2313 carries feedback information for DL-CC-2 in eNB 2313. Both UL-PCC and UL-CC-2 are configured with PUCCH that carries feedback channels for the component carriers in their respective eNB.

Figure 23C:
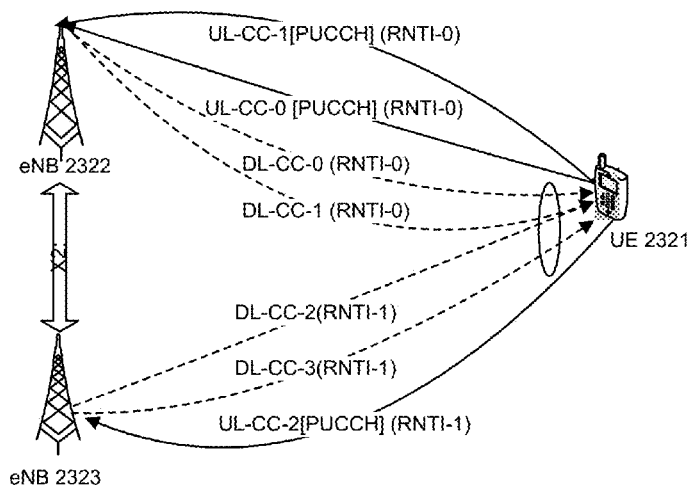
FIG. 23C shows an exemplary block diagram in accordance with one embodiment of the invention where there is one uplink component carrier for each of its associated downlink component carriers in an inter-eNB carrier aggregation system.

FIG. 23C shows an exemplary block diagram in accordance with one embodiment of the invention where there is one uplink component carrier for each of its associated downlink component carriers in an inter-eNB carrier aggregation system. UE 2321 connects with eNB 2322 and eNB 2323. eNB 2322 and eNB 2323 connect with each other via X2 interface. UE 2321 is configured with inter-eNB carrier aggregation with two UE-IDs RNTI-0 and RNTI-1 associated with eNB 2322 and eNB 2323, respectively. There are two downlink component carriers configured on eNB 2322, DL-CC-0 with RNTI-0, and DL-CC-1 with RNTI-0. Two downlink component carriers are configured for eNB 2323: DL-CC-2, with RNTI-1 and DL-CC-3 with RNTI-1. An uplink component carrier UL-CC-2 is configured on eNB 2313 with RNTI-1. In this option, one uplink CC is configured to carry feedback information one or more associated DL CCs connected with the same eNB. UL-CC-0 in eNB 2322 is associated with DL-CC-0. UL-CC-0 carries feedback information for DL-CC-0 in eNB 2322 for feedback information. UL-CC-1 in eNB 2322 is associated with DL-CC-1. UL-CC-1 carries feedback information for DL-CC-1 in eNB 2322 for feedback information. UL-CC-2 in eNB 2323 is associated with DL-CC-2 and DL-CC-3. UL-CC-2 carries feedback information for DL-CC-2 and DL-CC-3 in eNB 2313. UL-CC-0, UL-CC-1 and UL-CC2 are configured with PUCCH that carries feedback channels for the component carrier in their respective eNB.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
   establishing a primary connection with a UE in a primary cell belonging to a primary base station with a first UE-ID, wherein the primary cell comprises a downlink component carrier (CC) and an uplink CC;
   configuring a second connection with the UE in a secondary cell belonging to a second base station, wherein the secondary cell comprises a downlink CC, wherein an uplink CC of the primary connection is configured as a feedback channel for the downlink CC of the second connection;

configuring and aggregating component carriers of the primary cell and the secondary cell for the primary connection and the second connection; and performing mobility management functions through the primary connection.

2. The method of claim 1, wherein the second connection is configured through the primary connection.

3. The method of claim 1, wherein control signaling messages of Radio Resource Control (RRC) are configured to be carried on both the primary connection and the second connection.

4. The method of claim 1, wherein control signaling messages of RRC are configured to be carried on the primary connection only.

5. The method of claim 4, wherein the primary base station exchanges RRC messages with the second base station through a backhaul connection.

6. The method of claim 5, wherein the backhaul connection is a connection via X2 interface between the primary base station and the second base station.

7. The method of claim 1, further comprising:
assigning a second UE-ID to the second connection via a RRC reconfiguration message.

8. The method of claim 1, further comprising:
assigning a second UE-ID derived from a RACH Response message from the second base station to the second connection.

9. A method, comprising:
establishing a primary connection with a UE in a primary cell belonging to a primary base station with a first UE-ID, wherein the primary cell comprises a downlink component carrier (CC) and an uplink CC;
configuring a second connection with the UE in a secondary cell belonging to a second base station, wherein the secondary cell comprises a downlink CC and an uplink CC, wherein the uplink CC of the second connection is configured as a feedback channel for the downlink CC of the second connection;
configuring and aggregating component carriers of the primary cell and the secondary cell for the primary connection and the second connection; and
performing mobility management functions through the primary connection and the second connection.

10. The method of claim 9, wherein the second connection is configured through the primary connection.

11. The method of claim 9, wherein control signaling messages of Radio Resource Control (RRC) are configured to be carried on both the primary connection and the second connection.

12. The method of claim 9, wherein control signaling messages of RRC are configured to be carried on the primary connection only.

13. The method of claim 12, wherein the primary base station exchanges RRC messages with the second base station through a backhaul connection.

14. The method of claim 13, wherein the backhaul connection is a connection via X2 interface between the primary base station and the second base station.

15. A primary base station, comprising:
memory that contains a set of program instructions;
a radio frequency (RF) transceiver that transmits and receives radio signals; and
a processor that executes the set of program instructions in accordance with the radio signals and thereby controls the base station to perform the steps of:
establishing a primary connection with a UE in a primary cell belonging to the primary base station with a first UE-ID, wherein the primary cell comprises a downlink component carrier (CC) and an uplink CC;
configuring a second connection with the UE in a secondary cell belonging to a second base station, wherein the secondary cell comprises a downlink CC;
assigning a second UE-ID derived from a RACH response message from the second base station to the second connection;
configuring and aggregating component carriers of the primary cell and the secondary cell for the primary connection and the second connection; and
performing mobility management functions through the primary connection.

16. The base station of claim 15, wherein the second connection is configured through the primary connection.

17. The base station of claim 15, wherein control signaling messages of Radio Resource Control (RRC) are configured to be carried on both the primary connection and the second connection.

18. The base station of claim 15, wherein control signaling messages of RRC are configured to be carried on the primary connection only.

19. The base station of claim 18, wherein the primary base station exchanges RRC messages with the second base station through a backhaul connection.

20. The base station of claim 19, wherein the backhaul connection is a connection via X2 interface between the primary base station and the second base station.

* * * * *